US007889666B1

(12) United States Patent
Pei et al.

(10) Patent No.: US 7,889,666 B1
(45) Date of Patent: Feb. 15, 2011

(54) SCALABLE AND ROBUST TROUBLESHOOTING FRAMEWORK FOR VPN BACKBONES

(75) Inventors: Dan Pei, Jersey City, NJ (US); Zhuoqing Morley Mao, Ann Arbor, MI (US); Jia Wang, Randolph, NJ (US); Ying Zhang, Ann Arbor, MI (US)

(73) Assignee: AT&T Intellectual Property II, L.P., Reno, NV (US)

( * ) Notice: Subject to any disclaimer, the term of this patent is extended or adjusted under 35 U.S.C. 154(b) by 171 days.

(21) Appl. No.: 12/005,191

(22) Filed: Dec. 26, 2007

(51) Int. Cl.
    *H04L 12/26* (2006.01)
(52) U.S. Cl. .................................................... 370/242
(58) Field of Classification Search ........................ None
    See application file for complete search history.

(56) References Cited

U.S. PATENT DOCUMENTS

| 2004/0218525 | A1* | 11/2004 | Elie-Dit-Cosaque et al. ........................ 370/223 |
| 2005/0049988 | A1* | 3/2005 | Dahlquist et al. ............. 706/46 |
| 2006/0002289 | A1* | 1/2006 | Menon et al. ................ 370/216 |
| 2006/0087408 | A1* | 4/2006 | Korzeniowski ........ 340/286.02 |
| 2006/0126496 | A1* | 6/2006 | Filsfils et al. ................ 370/216 |
| 2007/0283436 | A1* | 12/2007 | Duffield et al. ............... 726/23 |

OTHER PUBLICATIONS

Wikipedia, "Lattice (order)", http://web.archive.org/web/20050831114548/http://en.wikipedia.org/wiki/Lattice_(order), Aug. 10, 2005, pp. 1-11.*

* cited by examiner

*Primary Examiner*—Chirag G Shah
*Assistant Examiner*—Otis L Thompson, Jr.
(74) *Attorney, Agent, or Firm*—Hanley, Flight & Zimmerman, LLC

(57) ABSTRACT

A system and method is disclosed for a scalable and robust network troubleshooting framework for VPN backbones addressing scalability and data imperfection. The framework takes advantage of lattice data structures to identify multi-dimensional hierarchical events that occur frequently across multiple data sources. Correlation schemes and inference rules are created for diagnosing network events and generating actionable reports for important events.

2 Claims, 18 Drawing Sheets

*FIG. 5*

| DATA | IMPACT | ROOT CAUSE | MITIGATION | INFORMATION FROM THIS DATA SOURCE ONLY |
|---|---|---|---|---|
| BGP | 11a,11b,11c,12a,12b,12c | R1b*,R1c*,R1d*,R1f,R2a,R2b,R2c | M2,M3,M4 | 11a,11b,11d,R2a,R2b,R2c,M2 |
| Syslog | 12b,12c | R1a,R1b,R1c,R1d | M1a,M2a,M1c | R1a,R1e,M1 |
| OSPF | 12b,12c | R1d, (Core)R1b,R1c,R1g | M2 | (CORE) R1g |
| SNMP | 11c,12b*,12a*,12d | (Edge)R1d*,R1g*,(Core)R1c*,(Edge)R1b*,4 | M4,M5 | 12d |

TABLE 1
ROOT CAUSE, IMPACT, AND MITIGATION ANALYSIS (* MEANS INFERENCE-BASED ANALYSIS)

FIG. 6

| VPN BACKBONE | VPN BB1 | VPN BB2 |
|---|---|---|
| STATISTICS | | |
| NO. OF ROUTERS | HUNDREDS | HUNDREDS |
| NO. OF VPN PREFIXES | THOUSANDS | TENS OF THOUSANDS |
| NO. OF CUSTOMERS | THOUSANDS | THOUSANDS |
| NO. OF SITES | TENS OF THOUSANDS | THOUSANDS |
| DATA AVAILABILITY | | |
| BGP | 2 REFLECTORS | 2 INDEP. REFLECTORS |
| OSPF | ALL AREAS | ALL-0 AREAS |
| Syslog | ALL ROUTERS | ALL ROUTERS |
| SNMP | NOT AVAILABLE | ALL ROUTERS |
| CONFIG | ALL ROUTERS | ALL ROUTERS |

TABLE II
COMPARISON BETWEEN VPN BB1 AND VPN BB2

DISTRIBUTION OF MESSAGE INTER-ARRIVAL TIMES IN VPN BB2

DISTRIBUTION OF EVENT COUNT PER PREFIX, LINK, VPN, AND ROUTER

EVENT CLASSIFICATION RESULTS IN VPN BB2

INTERVAL BETWEEN EVENTS OF THE SAME CAUSE IN DIFFERENT DATA SOURCE
DISRIBUTIONS OF TIME DIFFERENCES OF TWO EVENTS CAUSED BY THE SAME
ROOT CAUSES IN VPN BB2

*FIG. 11*

| COMPOSITION | MEANING | TEMPORAL Src 1 Src 2 | SPATIAL |
|---|---|---|---|
| RGP Syslog | LINK FAILURE CAUSES BGP UPDATES | 72.4%, 21 75%, 12 | 17.5%, 35 44%, 19 |
| RGP OSPF | HOT-POTATO EVENT CAUSES BGP CHANGES | 12.4%, 13 0.12%, 45 | 5.4%, 84 0.017%, 27 |
| RGP SNMP | BGP ROUTING-CHANGE CAUSE TRAFFIC SHIFT | 48%, 21 37%, 19 | 44%, 23 27%, 67 |
| Syslog OSPF | INTERNAL FAILURE CAUSES OSPF CHANGES | 0.12%, 17 0.008%, 8 | 0.018%, 5 2.4%, 67 |
| Syslog SNMP | SESSION/LINK/ROUTER FAILURE CAUSES TRAFFIC SHIFT | 25.8%, 21 22%, 19 | 5.8%, 2.3 2.4%, 59 |
| Syslog SNMP | INTRA-DOMAIN ROUTING CHANGE CAUSES TRAFFIC SHIFT | 24.5%, 87 38.7%, 32 | 15.7%, 2.3 24.7%, 7.5 |

TABLE III
CORRELATION RESULTS IN VPN BB2 (AVG% STD OF %)

FRACTION OF AFFECTED TRAFFIC CORRELATED WITH DIFFERENT EVENTS

| EDGE | SESSION U/D 20.8% | SESSION U/D 00.1% | ROUTER U/D 0.008% | EXC. LIMIT 0.0001% |
|---|---|---|---|---|
| CORE | COST CHANGE 0.3% | SESSION FLAP 0 | SESSION U/D 0.01% | ROUTER U/D 0.0002% |
| CUSTOMER | PREFIX CHANGE 71% | SITE 7% | VPN 0.001% | USER 10% |

TABLE IV
ROOT CAUSE RESULTS FOR VPN BB2

FIG. 15
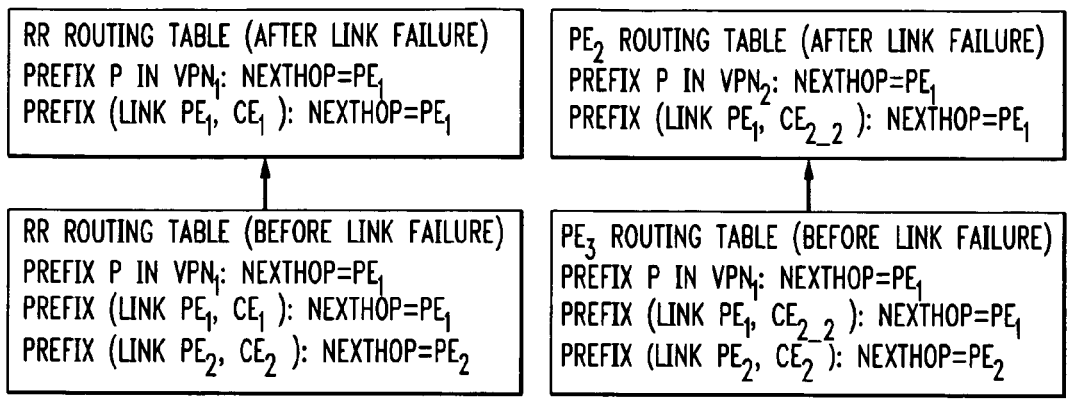
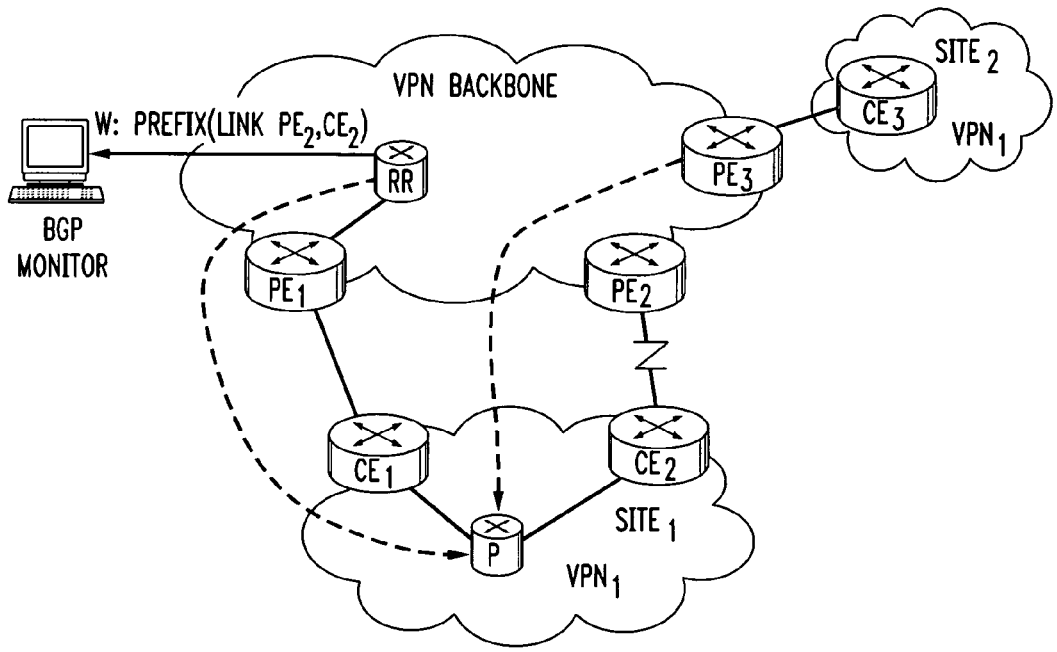
SCENARIO 1

SCENARIO 2

FIG. 18

|  | NO. Syslog FROM ONE LOCATION | ONLY AREA ZERO OSPF | BGP FROM A SINGLE RR |
|---|---|---|---|
| ROOT CAUSE (W/O) | 92%, 45.3 | 78%, 29.5 | 71%, 29.5 |
| ROOT CAUSE (WITH) | 96%, 4.3 | 85%, 13.7 | 85%, 41.2 |
| LOCATION (W/O) | 93%, 23.4 | 78%, 29.5 | 73%, 42 |
| LOCATION (WITH) | 96%, 4.1 | 87%, 21.4 | 98%, 42.3 |
| IMPACT (W/O) | 97%, 54 | 91%, 7.4 | 79%, 24.4 |
| IMPACT (WITH) | 98%, 13 | 93%, 6.8 | 84%, 36.3 |
| MITIGATION (W/O) | 93%, 224 | 22%, 31 | 91%, 13 |
| MITIGATION (WITH) | 97%, 5 | 91%, 22 | 93%, 5.8 |

TABLE V
TROUBLESHOOTING WITH SPATIAL MISSING DATA WITH/WITHOUT INFERENCE (AVG %, STD OF %)

FIG. 19

| | VPN BACKBONE SIZE |
|---|---|
| $r_T, r_e$ | NUMBER OF ROUTE REFLECTORS AND PE ROUTERS |
| $\lambda_{li}, \lambda_{le}$ | NUMBER OF INTERNAL AND EDGES LINKS PER ROUTER |
| $l$ | NUMBER OF INTERNAL LINKS: $\lambda_{li} \times (r_e + r_T)$ |
| $e$ | NUMBER OF EDGE LINKS: $\lambda_{le} \times r_e$ |
| $\lambda_{ses}$ | NUMBER OF BGP SESSIONS PER LINK ($\lambda_{ses} \leq 1$) |
| $l_s, e_s$ | NUMBER OF iBGP/eBGP SESSIONS: $l \times \lambda_{ses}, e \times \lambda_{ses}$ |
| | VPN CUSTOMER DISTRIBUTION |
| $\nu$ | NUMBER OF VPN CUSTOMERS |
| $\lambda_{site}$ | NUMBER OF SITES PER VPN CUSTOMER |
| $\lambda_p$ | NUMBER VPN PREFIXES PER SITE |
| $y$ | NUMBER OF SITES: $\lambda_{site} \times \nu$ |
| $p$ | NUMBER OF VPN PREFIXES: $\lambda_p \times y$ |
| | NETWORK BEHAVIOR |
| $\alpha_b$ | NUMBER OF BGP EVENTS PER VPN PREFIX PER SECOND |
| $\alpha_s$ | NUMBER OF Syslog EVENTS PER LINK PER SECOND |
| $\alpha_o$ | NUMBER OF OSPF EVENTS PER LINK PER SECOND |
| $\alpha_l$ | NUMBER OF TRAFFIC EVENTS PER LINK PER SECOND |
| $\beta_b, \beta_s, \beta_o, \beta_l$ | BYTE COUNTS OF MESSAGES PER BGP/Syslog/OSPF TRAFFIC EVENT |
| $T_{ij}$ | WINDOW SIZE FOR CORRELATING DATA SOURCES $i$ AND $j$ |
| $T_{max}$ | $Max\{T_{ij}\}, i,j \in \{b, o, y, t\}$ |
| $\gamma$ | POSSIBILITY OF TWO UNITS HAVING CORRELATED EVENTS |

TABLE VI
PARAMETERS USED IN SYSTEM SCALABILITY ANALYSIS

SYSTEM EXECUTION TIME OF GIVEN PERIOD OF EVENT MESSAGES
CONSISTING ALL DATA SOURCES

SCALABLE AND ROBUST TROUBLESHOOTING FRAMEWORK FOR VPN BACKBONES

BACKGROUND OF THE INVENTION

The invention relates generally to network communications. More specifically, the invention relates to a real-time troubleshooting framework for VPN backbones that troubleshoots network events exhibiting significant disruptions, and provides root cause analysis and mitigation suggestions.

Layer-3 Virtual Private Networks (VPNs) have had significant and growing commercial deployments. Effectively troubleshooting network events in VPN backbones for provider-based VPN networks is critical since these networks often carry traffic of important applications. Compared to traditional IPv4 (Internet Protocol version 4) networks, there is an even bigger scalability issue for managing a VPN backbone due to each VPN customer's ability to use the entire IPv4 address space.

A VPN is a communication network tunneled through another network and dedicated for a specific network. One common application is secure communication through the public Internet, but a VPN need not have explicit security features, such as authentication or content encryption. VPNs can be used to separate the traffic of different user communities over an underlying network with strong security features. A VPN may have best-effort performance, or may have a defined Service Level Agreement (SLA) between the VPN customer and the VPN service provider. Generally, a VPN has a topology more complex than Point-to-Point (P-to-P). The distinguishing characteristic of VPNs is not security or performance, but that they overlay other network(s) to provide a certain functionality that is meaningful to a user community.

A layer-3 VPN is a set of sites where communication takes place over a network infrastructure called a VPN backbone with restricted communication from external sites. The VPN backbone is typically shared by multiple VPNs which are referred to as VPN customers.

VPNs were previously provisioned using layer-2 technologies, such as Frame Relay (FR) and Asynchronous Transfer Mode (ATM). However, layer-2 VPN does not scale well because the number of required virtual circuits achieving optimal routing scales non-linearly as the network grows. Recently, layer-3 VPN has had significant and growing commercial deployments. Unlike layer-2 VPNs, layer-3 VPNs use Border Gateway Protocol (BGP) and a set of extensions known as BGP-VPN, to exchange the routes for VPN prefixes of a VPN customer among all the Provider Edge (PE) routers that are attached to the same VPN customer.

Similar to IP networks, VPNs are vulnerable to unexpected network events such as hardware failures, misconfigurations, and routing disruptions. Because VPNs usually carry mission critical applications, such as Voice over Internet Protocol (VoIP) and financial transactions that do not react well to network disruptions, it is highly desirable for network operators to react quickly to failures to ensure reliable services.

There are a number of challenges in achieving real-time troubleshooting of VPNs. First are the common problems associated with managing large IP networks. For example, the data volume is significant and consumes significant resources. Network measurement data can be imperfect and missing due to measurement errors such as noise and transmission errors such as data loss. Additionally, the troubleshooting tool needs to satisfy real-time constraints so that operators are able to react quickly to network events.

Second, compared to a traditional IP network, operators are facing an even bigger scalability issue with VPNs due the freedom to use the entire IPv4 address space by each individual VPN. A Route Distinguisher (RD) is assigned to each VPN. The tuple (RD, IP prefix) is used to uniquely identify a VPN prefix in a VPN backbone. As a result, the total number of routes observed in a VPN backbone is significantly larger than that observed in an IP backbone.

Third, unlike IP backbones where each edge router maintains routes for every prefix, each PE router in a VPN backbone only keeps routes for VPNs attached to the PE. Therefore, a troubleshooting tool has limited visibility unless a large number of PE routers are monitored further increasing the scalability challenge.

In view of the above challenges, what is desired is a system and method for a scalable and robust network troubleshooting framework for VPN backbones that addresses scalability in addition to common problems associated with managing large IP networks including dealing with imperfect data, handling significant data volume, and satisfying real-time constraints.

SUMMARY OF THE INVENTION

The inventors have discovered that it would be desirable to have a system and method that is a scalable, extensible, real-time troubleshooting framework for VPN backbones that is used to troubleshoot network events with significant disruptions and provide root cause analysis and mitigation suggestions. The system and method applies efficient lattice data structures to identify multi-dimensional hierarchical network events that occur very frequently, is extensible to new or missing data sources, applies inference rules to deal with imperfect data and applies decision-diagram based prioritization where events more likely to be correlated are processed and correlated first to achieve scalability.

By passively monitoring devices on the VPN backbones at multiple layers and granularities, the framework provides real-time reports for important network events in terms of location, root cause, impact, and mitigation. The framework eases a network operator's job by generating a small number of actionable reports based on an analysis of various data. Both domain knowledge and statistical analysis are used to provide accurate reports. The framework scales with the number of devices on the VPN backbones and number of VPN customers, and is robust to data imperfection. The framework performs troubleshooting given partial, imperfect, or missing data.

One aspect of the invention is a method for real-time troubleshooting virtual private network (VPN) backbones using domain knowledge and statistical analysis to model problems experienced by the VPN. Methods according to this aspect of the invention include monitoring a plurality of network data sources for network produced messages and data, identifying events from the data source messages and data that are within a predetermined time window and/or indicate changes in the network behavior, classifying the events into different event types, correlating the event types across the plurality of network data sources to identify related events, analyzing the related events for impacts to the VPN in type and degree, identifying the related event root cause based on location and exact cause wherein location indicates that the root cause occurred among the VPN backbone, customer network, or edge between them, and performing mitigation strategies based on the root cause.

Another aspect provides a framework for troubleshooting a virtual private network (VPN) backbone in real-time. Frameworks according to this aspect of the invention include a plurality of event identification modules configured to receive messages from a corresponding number of monitors in the VPN backbone and identify the received messages as events if a change occurs with a predetermined time window, or if the message is a deviation from a predefined metric, each event identification module having an output, a plurality of event classification modules each having an input coupled to a corresponding event identification module output, each event classification module configured to classify each identified event depending on the type of event (change), each event classification module having an output, a temporal correlation module having a plurality of inputs, each input coupled to each event classification module output, the temporal correlation module configured to perform time-window based and statistical based correlation for the identified and classified events, the temporal correlation module having an output, a spatial correlation module having an input coupled to the temporal correlation module output, the temporal correlation module configured to filter the correlated events, the spatial correlation module having an output, an impact analysis module having an input coupled to the spatial correlation module output, the impact analysis module configured to estimate a VPN impact based on an event type and degree, the impact analysis module having an output, and a root cause and mitigation module having an input coupled to the impact analysis module output, the root cause and mitigation module configured to identify each event's root cause location and failure, determine a mitigation strategy for that event, and output the mitigation strategy.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 5 is an exemplary table of root cause, impact and mitigation analysis.

FIG. 6 is an exemplary tabular comparison between two example VPNs, VPN BB1 and VPN BB2.

FIG. 11 is an exemplary VPN BB2 correlation result.

FIGS. 14, 15 and 16 show two scenarios of traffic on an exemplary PE2, CE2 link.

FIG. 18 is an exemplary comparison of troubleshooting with spatial missing data with and without inference.

FIG. 19 is an exemplary index of parameters used in scalability analysis.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "mounted," "connected," and "coupled," are used broadly and encompass both direct and indirect mounting, connecting, and coupling. Further, "connected," and "coupled" are not restricted to physical or mechanical connections or couplings.

The invention is not limited to any particular software language described or implied in the figures. A variety of alternative software languages may be used for implementation of the invention. Some components and items are illustrated and described as if they were hardware elements, as is common practice within the art. However, various components in the method and apparatus may be implemented in software or hardware such as FPGAs, ASICs and processors.

Embodiments of the invention are real-time troubleshooting frameworks for VPN backbones using both domain knowledge and statistical analysis. The embodiments use a multi-dimensional hierarchical lattice structure to model network problems observed in multiple data sources. The lattice structure allows for storing and correlating the multi-dimensional data efficiently and scalably. The system is a modular design that allows new data sources to be integrated with minimal effort.

VPN data is gathered for troubleshooting by passively monitoring devices on the VPN backbones at multiple layers and granularities. The monitoring devices are dedicated computer machines that establish BGP and/or Open Shortest Path First (OSPF) sessions with operational routers. They are used to collect BGP and OSPF data in the real network. Embodiments are for providing real-time VPN event reports in terms of location, root cause, impact, and mitigation. To achieve this, both domain knowledge and statistical analysis are used. The framework addresses the scalability challenge by adopting highly efficient data structures. The modular design makes the framework extensible to new data sources and develops inference rules to handle imperfect or missing data.

Figure 1:
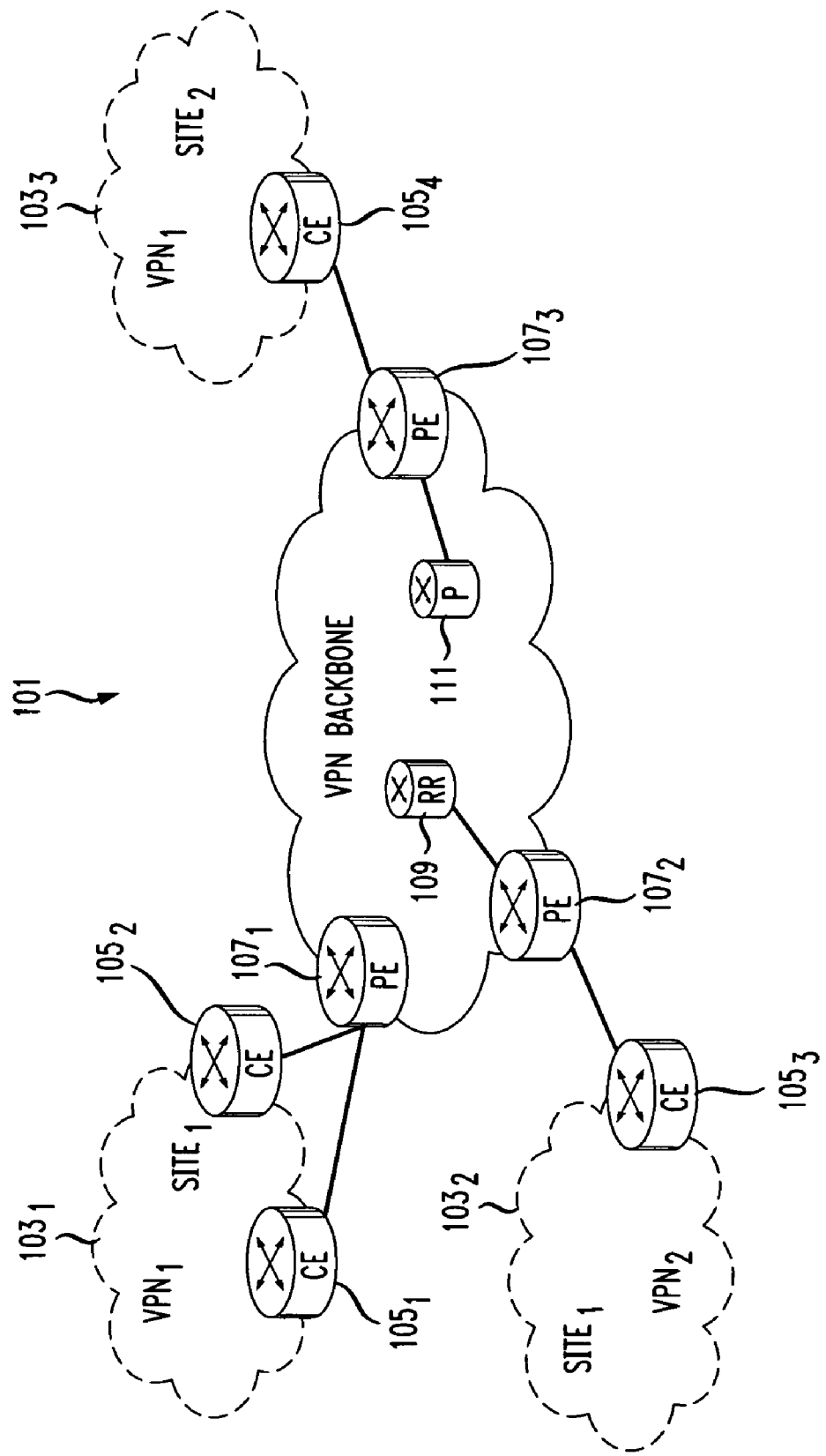
FIG. 1 is an exemplary provider based layer-3 VPN

FIG. 1 shows a typical VPN 101. A VPN is a private network for communicating among locations belonging to the same entity in a controlled manner. Provider-based layer-3 VPNs use Internet Protocol (IP) provided by an IP service provider's backbone. One implementation is to use Multiprotocol Label Switching (MPLS) to forward packets and BGP to distribute routes over the backbone. A site $103_1$, $103_2$, $103_3$, ... $103_m$ (collectively 103) is a VPN subnetwork and can communicate with other sites in the same VPN. Customer Edge (CE) devices $105_1$, $105_2$, $105_3$, ... $105_n$ (collectively 105) are connected to Provider Edge (PE) routers $107_1$, $107_2$, $107_3$, ... $107_o$ (collectively 107).

CEs are physical devices at the customer premises that provide access to the VPN service. Some implementations treat a CE as a demarcation point between provider and customer responsibility. PEs are devices such as routers at the edge of the provider network which provides the provider's view of the customer site. PEs are aware of the VPNs that connect through them and maintain the VPN state.

The PE routers perform the MPLS-based forwarding inside the provider network without additional VPN specific functions or state. A PE router 107 may also be a Route Reflector (RR) 109 to disseminate routes. A Provider device (P) 111 is inside the provider's core network and does not directly interface to any customer endpoint. The P 111 may be used to provide routing for many provider-operated tunnels that belong to different customers' VPNs. While a P 111 is a key part of implementing VPNs, it is not itself VPN-aware and does not maintain a VPN state. Its principal role is allowing the service provider to scale its VPN offerings by acting as an aggregation point for multiple PEs. P-to-P connections often are high-capacity optical links between major locations of a provider.

BGP in the VPN context has VPN specific attributes. A VPN prefix is uniquely identified by a Route Distinguisher (RD) and an IPv4 prefix, which is carried in BGP updates. The attribute Route Target (RT) identifies the set of sites that can use a particular route. Each PE router 107 maintains a VPN Routing and a Virtual Routing and Forwarding (VRF) table for each VPN. An MPLS-relevant label in the MPLS header contains information for traffic forwarding.

Frameworks use four data sources collected by passively monitoring network devices on a VPN backbone by using monitors.

1) Inter-domain Routing is obtained from BGP, the Internet's inter-domain routing protocol and is used to distribute VPN prefixes learned from CE routers 105 between corresponding PE routers 107. To exchange routing information, each border router establishes interior BGP (iBGP) sessions with neighboring border routers in the same network and exterior BGP (eGBP) sessions with border routers outside of the network.

When a PE router 107 learns of a routing update from a CE router 105 connected to it, the PE router 107 will distribute the updated route to other PE routers 107 to which CE routers 105 of the same VPN customer are connected. Each PE router 107 maintains separate forwarding tables for each VPN customer to which the PE router 107 connects to ensure that routes from different VPN customers remain distinct and separate, even if multiple VPN customers use the same IP address space. RRs 109 are widely used to scale iBGP topologies.

Every BGP update message is indicative of a routing change. By monitoring BGP routing updates, operators are able to detect routing disruptions such as loss reachability, flapping routes, etc. Ideally, one can deploy a BGP monitor which connects to every PE router 107 on the VPN backbone via iBGP sessions to learn best paths selected at PE routers. However, this may not be feasible if the number of PE routers 107 is large. Alternatively, the BGP monitor can connect to route reflectors. The disadvantage of this setup is that the BGP monitor is able to see best paths selected at route reflectors 109, which may be different from those selected at corresponding PE routers 107. Embodiments use a BGP monitor that connects to multiple router reflectors 109 in the VPN backbone. A BGP monitor is a dedicated computer machine located within the network in question, and it establishes BGP sessions with various border routers and route reflectors in the operational network. It collects real-time BGP data and periodic table dumps. The impact of limited visibility on troubleshooting results is discussed below.

2) Intra-domain Routing is obtained from the OSPF protocol, a link state routing protocol that is commonly used for intra-domain routing on the Internet. Embodiments may be used with other intra-domain routing protocols. With link state protocols, each router in the network discovers and builds a complete and consistent view of the network topology as a weighted direct graph. Each router computes a shortest path tree with itself as the root, and applies the results to build its forwarding table. Routers running OSPF describe their local connectivity in Link State Advertisements (LSAs). A change in the network topology requires affected routers to originate and flood appropriate LSAs to other routers in the network. By carefully monitoring LSAs flooded in a VPN backbone, the time and location of changes in the network topology may be learned. An OSPF monitor is a dedicated computer machine located within the network in question, and it establishes OSPF session with OSPF routers in the operational network. It collects real-time OSPF update messages.

3) Router Error Logs are obtained from SYStem LOG (Syslog) protocol. Syslog is a protocol used to transmit event messages and alerts across an IP network. By default, a Cisco router generates the Syslog messages based on events that happened at the router, and sends Syslog messages via User Datagram Protocol (UDP) to logging servers. The logging servers collect the Syslog messages from all the routers in the network and provide the messages to the invention. A single network event may trigger multiple Syslog messages in physical layers, link layers, and network layers. By examining Syslog messages reported by a router, errors (e.g., FIFO queue is full) a specific router experiencing an event may be identified.

4) Network Traffic Reports are from Simple Network Management Protocol (SNMP) for gathering statistical data about network traffic and the behavior of network device component (e.g., router interface) via UDP packets is employed. SNMP agents expose management data on the managed systems as variables The SNMP servers periodically poll the SNMP variables near real-time from the routers, and provide the variables to the framework. A different traffic report data source is NetFlow, which may be used to monitor network traffic at the flow-level, collected by a NetFlow collector, and generate aggregated traffic reports. By monitoring traffic volume carried on each link, operators can identify unexpected traffic shifts and determine impact of observed network events.

Figure 2:
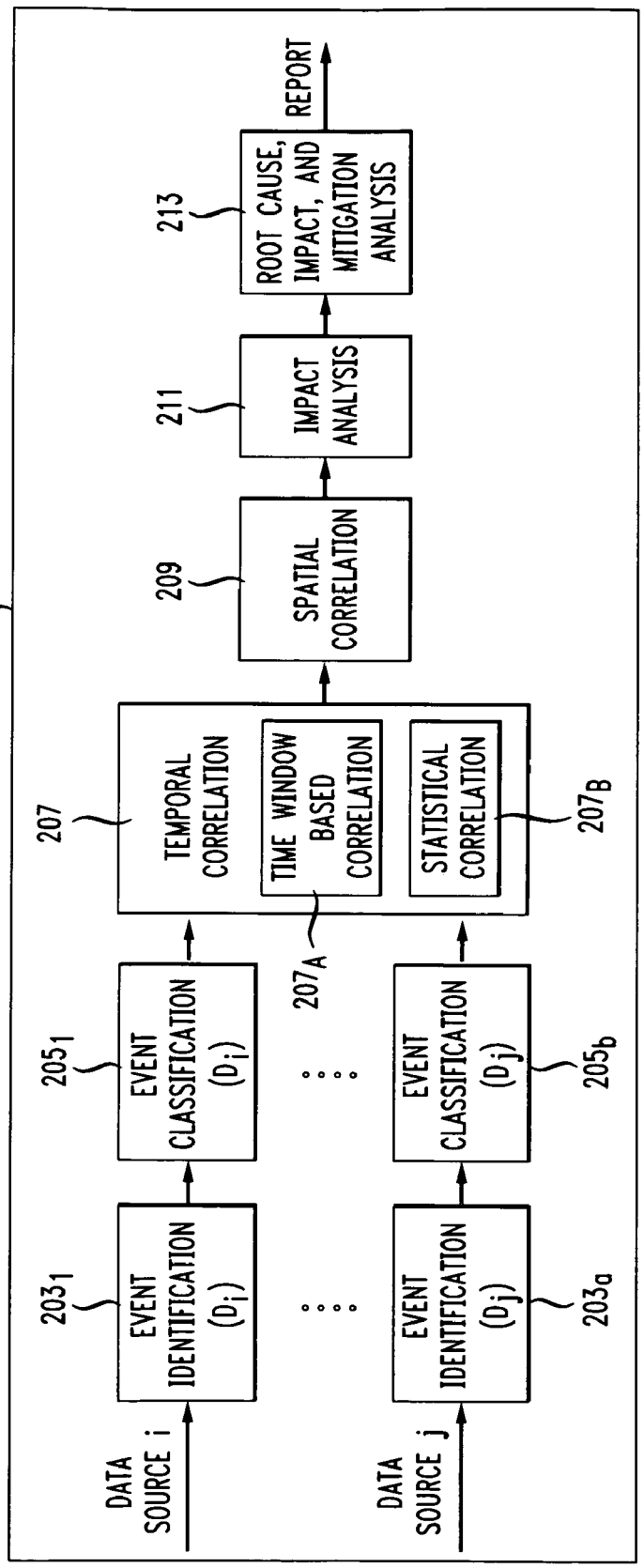
FIG. 2 is an exemplary framework architecture.

FIG. 2 shows the troubleshooting framework 201 comprising input modules coupled to each specific data source monitoring device. For example, event identification modules $203_1, 203_2, \ldots 203_j$ (collectively 203) and event classification modules $205_1, 205_2, \ldots 205_j$ (collectively 205) are specific and coupled to the data source monitoring devices listed above. System-wide modules are coupled to the event classification modules 205. The system-wide modules are for temporal 207 and spatial 209 correlations, impact analysis 211, and root cause and mitigation analysis 213.

The framework 201 is deployed as a network-enabled framework and is accessed using a graphical user interface (GUI). The application code resides on an application server or a plurality of application servers, and is accessed by users via a client application Web browser such as Mozilla Firefox, Netscape, Microsoft Internet Explorer and others, or via another client access software application that is not a general-purpose browser. This access takes place over a distributed transaction system using custom or standard Internet languages and protocols, and may involve scripting languages including Hypertext Markup Language (HTML), dynamic HTML (DHTML), Microsoft VBScript (Visual Basic Scripting Edition), Jscript, ActiveX, XML and Java.

A user's client application contacts the server hosting the framework 201. The server sends information to the client application which displays the results to the user.

The framework 201 is modular and is deployed as software as an application program tangibly embodied on a program storage device. Users access the framework 201 by accessing the GUI via a computer(s) (not shown).

The event identification modules 203 are coupled to each specific data source. The event identification modules 203 identify the events which may be one or a group of messages, which signal the same network change from raw network messages (described above). There are two different ways to identify events depending on the type of the data source. If a message itself indicates some changes in the network, for example, BGP or Syslog messages, the raw messages close in time are grouped into an event since they can be triggered by the same network change. If a message is a measured metric, for example, the traffic report in SNMP or NetFlow, an anomaly detection algorithm is applied to capture the abrupt changes that deviate from overall normal behavior. An output from each event identification module 203 corresponding to an input data source type is coupled to an event classification module 205 which receive the different types of events from the grouped data sources raw messages.

The event classification modules 205 classify the grouped events from respective event identification modules 203 into different classifications that may be used for correlation. The event classification types are specific to each data source, typically based on the type of changes the event indicates. For example, based on the BGP update message type (withdrawal or announcement), a BGP event may be classified as a loss or a gain of reachability. An output from each event classification module 205 is coupled to the temporal correlation module 207 which receives all classified events.

The temporal correlation module 207 receives the classified events originating from the different data sources and temporally correlates them. The framework 201 employs two temporal correlation techniques, time window-based 207A and statistical 207B. In time window-based correlation 207A, two events in two different data sources are correlated if they occur close to each other (within a T-second time window before or after each other). The window size T is specific to the data sources involved, and may be obtained based on the techniques such as protocol timer behaviors. For the statistical correlation 207B, an overall statistical correlation coefficient for each correlated network elements/units is kept long term to identify highly correlated events. Temporal correlation alone may generate false alarms, especially in the short term. For example, if there is one prefix that is experiencing persistent route flapping, when a totally unrelated Syslog BGP session failure event happens, these two events may be incorrectly correlated by temporal correlation because they overlap in time. An output from the temporal correlation module 207 is coupled to the spatial correlation module 209 which receives the time correlated events.

The spatial correlation module 209 receives the classified time-correlated events and filters false alarms based on domain knowledge. Domain knowledge is obtained based on expert knowledge about how different data sources should be correlated, and are programmed into the spatial correlation module 209. For example, a correlation between one BGP update event and one Syslog session failure event requires not only that they occur close in time, but also that the failed session can possibly announce the prefixes in the BGP update event. An output from the spatial correlation module 209 is coupled to the impact analysis module 211 which receives the time correlated/filtered events.

The impact analysis module 211 estimates the event impact in two dimensions, impact type and impact degree. Impact type includes loss or gain of connectivity, or path changes. The impact degree is measured based on several metrics: the volume of the traffic affected, number of prefixes (and their sizes) affected, the number of customer networks (and their sizes) affected, number of sites (and their sizes) affected. An output from the impact analysis module 211 is coupled to the root cause and mitigation analysis module 213.

The root cause analysis and mitigation analysis module 213 performs root cause analysis and proposes corresponding mitigation strategies. The root cause consists of two articles of information, the location of the root cause, and the exact cause. The location of the root cause indicates where among backbone, customer network, or the edge between them, where the root cause occurred. The exact cause indicates exactly at which physical devices (e.g. which link and at which layer) the root cause happened and the type of the changes (e.g. link up or down). In some cases, such as the location is in customer network, which a VPN backbone does not directly monitor, the exact reason cannot be obtained from existing data sources. For this case, the classification of the exact reason (whether only one prefix changed paths, or all the prefixes in a customer VPN changed path) is provided. Mitigation strategies are proposed based on the root causes. For example, if the root cause is associated with a particular physical device, the mitigation strategy is to replace that physical device.

Figure 3:
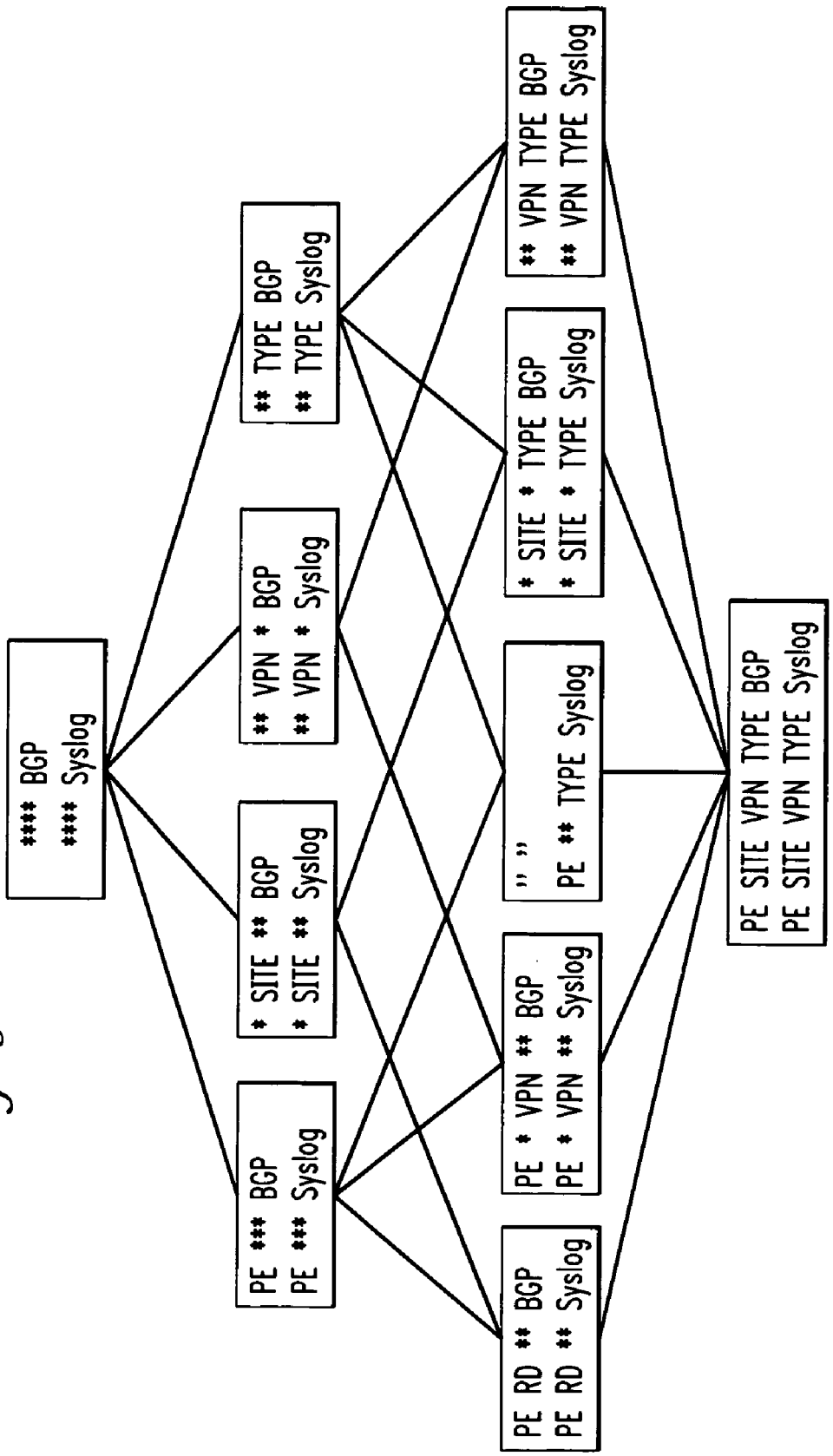
FIG. 3 is an exemplary correlation between BGP and Syslog at different levels using a lattice data structure.

The framework 201 needs to support a large number of prefixes, devices and customers, multiple data sources, and the multiple correlations at different levels and granularity (interface, router, PoP, Network). To conduct fast and accurate correlation, accurate information for the short-term correlation and summary and aggregated information for the past correlation results need to be stored. The framework 201 employs a highly efficient data structure that is multi-dimensional to support multiple data sources, stores as few states as possible for correlations, and has an efficient updating algorithm to support the real-time requirement. The framework 201 may adopt any data structure that satisfies above requirements such as a lattice structure (diamond) in the temporal correlation module 207. FIG. 3 shows an exemplary lattice diagram.

The lattice diagram is used to prioritize and accelerate correlation. The lattice detects the most possible cause as early as possible. For example, if the process begins with the messages (from any data sources) that directly provide root cause information (e.g. a Syslog message indicating a device status change), the lattice correlates the messages with other data sources.

The framework 201 is extensible and may incorporate new data sources when they become available. First, the data source receiving modules (event identification 203 and event classification 205) are developed. Second, for system-wide correlations, correlation (temporal 207A and spatial 207B) rules may be defined between the new data source and the existing data sources. Finally, the impact 211, root cause and mitigation strategies 213 may be defined to include the data source specific information.

The data monitored from the data sources may be imperfect due to lack of complete data caused by data loss or limited visibility. Data loss can result from unreliable data transport such as UDP used by data sources such as Syslog and SNMP.

Therefore, the accuracy of the diagnosis can be impacted by incomplete data. Data sources such as BGP have inherently limited visibility because a router only announces its own best path, and it is usually infeasible to monitor all BGP routers.

To deal with imperfect data, rules to detect missing data when sequence numbers are available (e.g., Syslog and OSPF) are developed and define a set of inference rules for identifying the possible root causes, based on the intuition that a network change often triggers messages in different data sources.

In the event identification module(s) 203, events from each data source are identified in two ways depending on the data property. If each raw message directly contains semantic information of the relevant state changes of the network, events are identified by aggregating multiple successive messages. BGP updates indicating inter-domain routing changes, OSPF data denoting intra-domain routing changes, and Syslog messages reflecting router status changes all belong to this category. Grouping multiple messages into a single event is needed as one network event can trigger multiple raw messages due to convergence and timers.

Messages of the second data type usually capture the current behavior of the network without directly revealing changes of the state. Flow-level traffic data measured using NetFlow and link utilization presented in SNMP belong to this category. To identify events in behavior data, anomaly detection to capture abrupt changes or deviations from normal behavior is used. Described below is event identification for both data types.

For inter-domain routing events, BGP updates close in time for the same VPN prefix are grouped into one BGP event. The time window used for grouping as for other events described later is determined empirically as described below along with knowledge of timer values. A VPN prefix is uniquely identified by the IPv4 prefix and the Route Distinguisher (RD) attribute. RD is used as part of the identifying information as prefixes announced by different sites of the same VPN can have different RDs.

For intra-domain routing events, the framework 201 also applies to other link state protocols such as Intermediate System to Intermediate System (IS-IS). The framework 201 examines OSPF distance changes between all PE-PE, PE-P, and P-P pairs. The framework 201 applies known techniques to analyze OSPF topology changes using Link State Advertisements (LSAs) collected by an OSPF monitor. Using empirically determined time windows, the framework groups messages for the path or path cost changes between one router pair into one event. The event classifier(s) 205 aggregates messages generated by a single network event, for example, the successive route flapping of a link. Each OSPF event contains information of the area, router, path, and path cost. There are three types of OSPF events based on the reachability impact, path cost increase/decrease, path loss, and path gain. Among all router pairs, path cost changes between two monitored RRs and all other PEs might impact the RRs' BGP route selection process, a phenomenon also known as hot potato effect, which can be observed by correlating with BGP updates of the monitored RR.

For router events, Syslog messages capture router-level events. The event classifier 205 classifies them at three layers, the physical layer, the link layer, and the IP layer such as BGP session layer. Error messages are considered which may affect connectivity, for example, messages indicating received prefix count to be above the maximum limit. Syslog messages are related to sessions or links between PE and CE, PE and PE, PE and P, or P and P. Messages of the same VRF session occurring close in time together are grouped together.

Although a BGP message contains the VRF number, the physical and link layer messages do not contain the VRF information but only the interface card name. Router configurations are used to map the interface to the VRF for identifying the corresponding RD.

For SNMP traffic events, the second approach to event identification is based on anomaly detection. Traffic volume in SNMP data is used to illustrate this. The goal is to identify traffic abnormality on each link. One approach for anomaly detection is adopted in IP networks by treating abnormality as abrupt changes in time series modeled using an autoregressive (AR) process. A hypothesis test based on the generalized likelihood ratio (GLR) is used. The event is identified if the output abnormality indicator is above a certain threshold. Sudden traffic changes including sharp increase, sharp decrease, and overall behavior changes can be identified. The degree of impact is measured based on the difference of means of history and current traffic data.

Event classification 205 defines different event types according to the semantic of the change and subsequent impact on the network in terms of gain or loss of reachability and types of traffic shift.

BGP events are classified into nine types based on its impact on network reachability and route changes. The classification takes advantage of the ability to distinguish prefixes announced by different VPN sites of the same VPN to identify nexthop loss and next change events. The framework 201 examines attributes directly impacting reachability: nexthop, AS path, and label. Gain of nexthop or connectivity denotes changes from the state of no route to the state of at least one available route. It is the opposite case for loss of nexthop or connectivity. For the remaining types, the event denotes changes of some attributes or properties of the route. Each prefix has a nexthop set. The nexthop set is compared before the event $\{N_b\}$ with that after the event $\{N_a\}$ to study nexthop changes. The nine BGP classifications are:

1) Nexthop loss: $\{N_a\} \subset \{N_b\} \& \{N_a\} \{\text{fourth root}\} 0$.
2) Nexthop gain: $\{N_a\} \supset \{N_b\} \& \{N_b\} = 0$.
3) Connectivity loss: $\{N_a\} \subset \{N_b\} \& \{N_a\} = 0$.
4) Connectivity gain: $\{N_a\} \supset \{N_b\} \& \{N_b\} = 0$.
5) Nexthop and AS path changes could be due to changes to the egress PE connected to another site of the same VPN.
6) Nexthop changes with unmodified AS path could be due to the egress PE changes which are connected to the same site or sites configured in the same AS.
7) AS path changes with unmodified nexthop could be caused by the PE learning routes from more than one CE and changing the best route.
8) Label changes with unmodified nexthop and AS path could be caused by the session flap between PE and CE.
9) Other changes besides nexthop, AS path, and label have changed.

Four types of OSPF events, path cost increase, path cost decrease, path loss, and path gain are defined according to path cost changes for each router pair.

Syslog events may be single direction changes such as the event contains changes in only one direction. For example, link or session changes from up to down or down to up. Multi-direction changes, for example, up to down to up. Up-Up: link or session flaps with the final status remaining up. Link or session flaps with the final status changing from up to down. Link or session flaps with the final status changing from down to up. And link or session flaps with the final status remaining down.

SNMP events are defined to be sharp increase, sharp decrease, and overall behavior changes.

The temporal 207 and spatial 209 correlators correlate events across data sources to identify related events. FIG. 3 shows a lattice structure that stores the correlation statistics. Two types of correlation, time-window based correlation 207A and statistical correlation 207B are performed. Assertion rules are used to improve correlation accuracy.

A lattice is a multi-dimensional hierarchical data structure containing a regular multi-dimensional data structure with an axis along each dimension. The data is modeled in a k-dimensional lattice since k types of data sources are available. Each dimension k has m attributes forming a hierarchy. Each node in the lattice contains k elements and each element has m different attributes corresponding to different hierarchy levels. The lattice is a partially ordered set in which every pair of events has a unique join and a meet to form axiomatic identities. For any two elements k of the lattice, the set (x, y) has a least upper bound, join, and a greatest lower bound, meet. The join and meet of a set (x, y) are denoted by x ∨ y and x ∧ y, respectively. Because joins and meets are assumed to exist in a lattice, ∧ and ∨ are binary operations. FIG. 3 shows a lattice projected to a 2-d space for BGP and Syslog correlations. The definition of the generalization of one element on some attributes is rolled-up one level in the hierarchy of that attribute. For example, generalization of element (Link1,PE1,Site2,VPN3) on the attribute of link is element (*,PE1,Site2,VPN3), indicating any CEs on Site2 of VPN3 connecting to PE1. Similar to the above definition, the lattice height is a function of k and m, while the lattice size is related to the number of possible correlations.

The "rolled-up" operation is that the value of a node is allocated to each of all its parents and then the node is deleted. Running in real-time and as the network size increases, to support scalable troubleshooting software, identification of HHH must be performed without keeping all of the aggregation level details. For example, the prefixes may be aggregated into different mask lengths, or even be aggregated into a site. Performing aggregation means that the state for the lower granularity nodes is not kept. Thus, an online data stream algorithm for online updating operation with modification according to the two specific definitions of HHH. In this scenario, the different hierarchies may be defined as follows: PE-based are events belonging to the same provider router and are considered together. RD-based are events of the same site are considered in one time series. The detailed definition in different networks is addressed below. VPN-based are events related to a single VPN in the same time series. Type-based are events from different data sources with the same type analyzed together.

The temporal correlation module 207 in the framework 201 implements insert, compress, and output algorithms in d dimensions. The compress operation is implemented as an option used under memory constraints.

Under the data structure described, the framework 201 performs time-based 207A and statistical correlation 207B. As an example, time-based correlation is described considering events in data source i and j, for a given event in data source i. Any events in data source j are correlated if they occur within a certain time window T before or after the event.

The time window T is defined depending on the data sources. There are two ways to define the window size, timer-value based or empirically determined, as timer interaction partly explains the timing difference across data sources. The details for both are described below.

The framework 201 estimates the distribution, frequency and burst properties of a time series based on the analysis of the distribution of inter-arrival times and determines the correlation between different time series using independence hypothesis testing.

For a stationary time series $x_i$, $y_i$ each is assumed to be a Poisson distribution. The mean and variance is determined using the independence hypothesis.

The correlation coefficient $r_{x,y}$, can be derived from $$r_{xy} = \frac{\sum_{i=1}^{N} x_i y_i - N\overline{xy}}{\left[\left(\sum_{i=1}^{N} x_i^2 - N\overline{x}^2\right)\left(\sum_{i=1}^{N} y_i^2 - N\overline{y}^2\right)\right]^{\frac{1}{2}}}. \quad (1)$$

The acceptance region for the hypothesis of zero correlation (independence) is given by $$-z_{\frac{\alpha}{2}} \leq \frac{\sqrt{N-3}}{2}\ln\left[\frac{1+r_{xy}}{1-r_{xy}}\right] \leq z_{\frac{\alpha}{2}}, \quad (2)$$

where z is the standardized normal variable. Values outside the above interval would be treated to have statistical correlation at the α level of significance.

Besides purely timing based grouping, the framework 201 also tests correlated pairs using assertions defined by domain knowledge based on spatial information to reduce false positives. Correlated BGP and Syslog events have matched types, correlated BGP and Syslog events have the same RD, correlated BGP and OSPF events have the common PE router, and correlated OSPF and Syslog events have at least one common PE router on the path of OSPF path.

Figure 4:
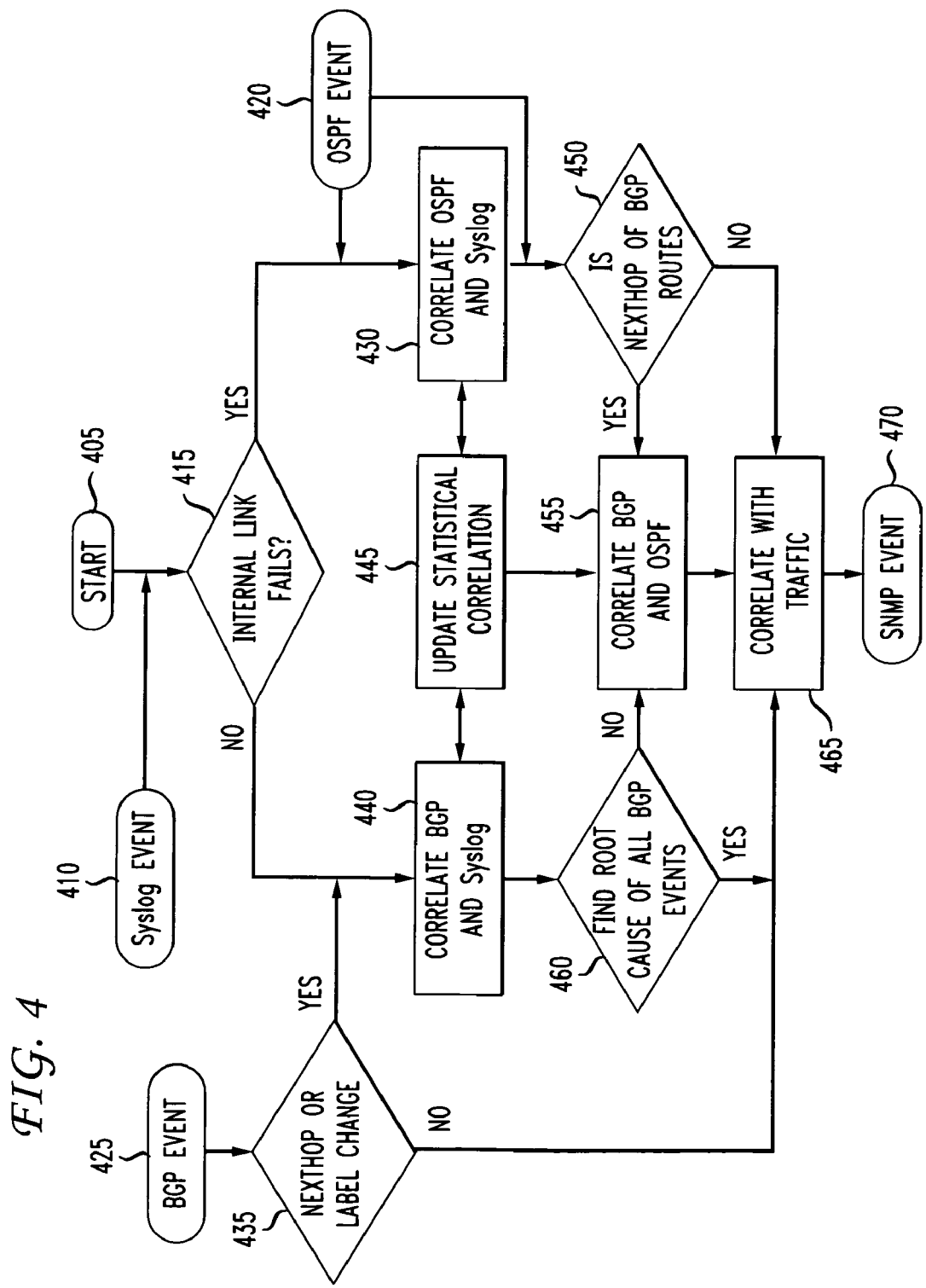
FIG. 4 is an exemplary method.

FIG. 4 shows the method to prioritize the order of correlation analysis since the framework 201 detects the most likely cause early. Since likelihood is based on previous information, the method accelerates correlation. The high level intuition is to correlate the most likely correlated events first. The method begins with Syslog, as its message directly relates to device status changes (steps 405, 410). Syslog messages indicate link failures. Based on the event type (step 415), the framework correlates either OSPF (step 420) or BGP (step 425). If there is an internal link failure, the event will cause intra-domain routing changes based on the domain knowledge. The event is correlated with the OSPF event (steps 415, 420, 430). If there is no internal link failure, the event is correlated with inter-domain routing changes abstracted from BGP information (steps 415, 435, 440). Elimination within a single data source, e.g., BGP updates with no changes in nexthop and label, can eliminate the correlation with Syslog and OSPF as the egress point is unchanged (step 435). The statistical information is updated (step 445) from both correlations. Sometimes inter-domain events from BGP may be caused by the intra-domain path changes, i.e., hot-potato routing (steps 435, 450). Therefore, BGP is correlated with OSPF events if there is any OSPF event affecting the nexthop of any BGP route, which could potentially cause hot-potato changes (step 450). BGP is correlated with OSPF (steps 460, 455). The events are further correlated with traffic SNMP anomalies to measure the impact (steps 465, 470).

For each step in FIG. 4, events are correlated with the most possible data source ranked by a statistical correlation coefficient and update relevant statistics. The data source is ranked according to the bandwidth and processing time required choosing the less expensive data source to correlate first.

FIG. 5 shows Table I that characterizes data, event impact, root cause, and mitigation from a data source. The inference rules to deal with imperfect data follow along with techniques to compute associated impact and suggestions for relevant mitigation responses.

For root cause (location, reason or classification), the location, either the edge or core is indicated. The following notation is used. NH(p, t) refers to the nexthop set of prefix p at time t; RD(s) denotes the RD value of session s, and RD(p) indicates the RD of p, VPN(x) indicates the VPN of x, which may be a prefix, an edge link, or a PE/CE router. t−1 represents the time before the event and t+1 is the time after the event.

The physical layer, link layer, or session layer problems are identified using Syslog.

Link L/session S on router R up/down are identified using:
BGP: (Edge)

∀ prefix p: ((NH(p, t−1)=R) & &(RD(S)=RD(p)) & &(R∉NH (p,t+1))). The opposite holds for link up;
OSPF: (Core) LSA of adjacency changes;
Syslog: link or session down/up messages; and
SNMP: abrupt traffic volume decrease or increase on the link.

For session S flaps:
BGP (Edge): ∀ prefix p:

∀prefix p:((NH(p,t−1)=R)& &(RD(S)=RD(p))&&(R∉NH (p,t+1)))&&(frequency>φ);
OSPF: (Core) LSA of flap messages;
Syslog: repeated link/session down/up messages; and
SNMP: repeated traffic increase and decrease on the associated link.

For Router R up/down:
BGP: (Edge)

∀ prefix p:((NH(p,t−1)=R)&&VPN(p)=VPAT(R)&& (R∉NH(p,t+1)));
Syslog: missing Syslog messages from R and link or session failure. The opposite holds for router up;
OSPF: adjacency change of all links and routers connected to R; and
SNMP: sharp traffic decrease/increase on all links of R.

For Maximum prefix limit exceeded (Edge):
Syslog: relevant error messages; and
BGP: the number of prefixes announced by a single-connected CE using the same nexthop PE is close to the maximum prefix limit.

For BGP misconfigurations: (Edge) update for a prefix announced with a wrong Route Target (RT).

For internal link weight changes (Core):
OSPF: LSA of path cost changes;
BGP: hot potato changes observed from BGP messages; and
SNMP: traffic shifts from one egress point to another of the same VPN.
Location: customer networks.

For single/multiple prefix path changes:
BGP: relevant updates for the prefix; and
SNMP: potentially significant traffic volume changes.

For path of prefixes of the entire site changes:
BGP: updates for prefixes with the same RD; and
Traffic: observable if prefixes of the entire site have changed reachability status or the egress PE.

For path of prefixes of the entire VPN changes:
BGP: updates for prefixes with a different RD, but belonging to the same VPN; and
Traffic: traffic volume on different links of the same VPN changes.
Location: other networks, due to end-user behavior, identified by significant traffic changes uncorrelated with other events.

Impact:
Impact type: (a) loss/gain connectivity, (b) path changes, and (c) isolation violation.
Impact Degree Measured By:
The number and size of impacted prefixes;
The number and size of impacted sites;
The number and size of impacted VPNs; and
The total amount of traffic impacted.
Mitigation Strategies:
Correct hardware problems associated with physical devices (Root causes for Edge).
Report frequently flapping prefixes caused by customer network (Root cause).
Raise alarms for exceeded maximum prefix limit or fix misconfigurations (Root cause Edge or Impact 1a, 1b, 1c).
Multi-home to ensure resilient connectivity to entire site/VPN (Impact for Core).
Perform traffic engineering to ensure Quality of Service (QoS) (Impact or Root cause for Core).

Inference rules are described for identifying root cause and event impact given imperfect data. The basic assumption of inference rules is that events in one layer usually affect other layers based on known dependencies. For example, link failure triggers routing updates for all the prefixes using the link. This assumption may not hold in rare cases, e.g., the customer network intentionally withdraw and reannounce a path to another PE.

The inference process in the root cause, impact and mitigation module 213 identifies:

Equivalent classes based on correlated pairs across k data sources with causal relations R. A graph is constructed where a data source is represented as a vertex, and a causal relationship as an edge. The source vertex is defined to be the base root cause. The hop count of a vertex is the shortest path to the source vertex. The smaller the hop count, the lower the vertex is positioned. The equivalent class is identified by the common lowest vertex of all the events, and correlated HHHs in the lattice by identifying HHHs in the highest level of the detected events with all the correlated data sources.

The root cause, impact and mitigation module 213 outputs root cause, impact, and mitigation analysis for each equivalent class which may contain events with the type of "missing data" to be dealt with using the following inference rules:

1) Edge link status changes cause updates for all the prefixes using the link as the nexthop.
2) Internal link status changes cause all OSPF paths traversing a link to change.
3) Best route changes in PEs affect traffic egress points.
4) Edge link status changes cause traffic shifts.
5) BGP updates affect traffic volume of the single-connected prefixes and traffic shifts between two links for multihomed prefixes.
6) Internal link status changes affect traffic on the link.

The framework 201 was applied to two VPN backbones both managed by one Tier-1 ISP over a one-month period to acquire data. For this analysis, a measurement infrastructure is presented and then the results for event identification and classification, correlation, impact analysis, and root cause analysis, and mitigation strategies are shown and described. The results for dealing with imperfect data are also shown.

The monitoring infrastructure for the two VPN backbones (denoted VPN BB1 and VPN BB2) is described. FIG. 6 shows Table II which lists the statistics and data availability for VPN BB1 and VPN BB2.

The BGP updates were collected by a BGP monitor (described above) which establishes an iBGP session with Route Reflector(s). For VPN BB2, a monitor connects via TCP to two reflectors which learn the routes to all VPN prefixes. For VPN BB1, a separate BGP monitor connects to two reflectors, each of which learns the routes to one separate set of VPN prefixes. The OSPF updates were collected using OSPF monitor techniques (described above), in which the monitor has a direct physical connection to an OSPF router in the monitored network. In VPN BB1, all OSPF messages were monitored, but in VPN BB2, only the area 0 has detailed information and there is only summarized distance vector-like information for non-area 0 links and routers. The SNMP traffic record (interface byte count) in VPN BB2 was collected for each interface in the network every 5 minutes, but it was not available in VPN BB1. For both backbones, the Syslogs were sent from all the routers to a centralized server.

VPN BB1 has a larger scale than VPN BB2, while BB2 has more available monitoring data. The framework 201 was applied to both backbones using their available data sources. Only the results for VPN BB2 are described with the results for BB1 being similar. All significant differences between BB1 and BB2 are described.

For event identification, either time window-based approach for BGP, Syslog, and OSPF, and anomaly detection algorithm for SNMP, was used.

Figure 7:
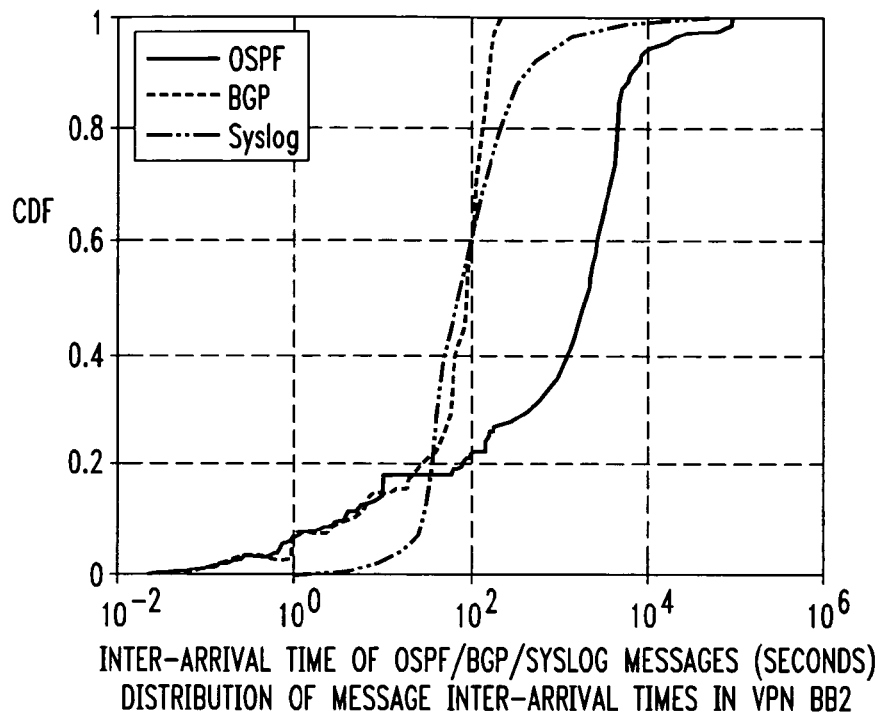
FIG. 7 is an exemplary VPN BB2 plot of a distribution of message inter-arrival times.

The time window-based approach is for those data sources in which a message indicates a change. The intuition is to group messages with the same cause together, which might be received one after another due to various delays. The framework 201 determines the time window size based on an estimation of the maximum inter-arrival time of messages with the same cause. Syslog window size is designed to group the messages of quick route flaps. FIG. 7 shows the Syslog down time period tracked as a Cumulative Distribution Functions (CDF) of message inter-arrival times and uses the turning point of the curve, where the x-axis value equals 55 seconds as the time window size. Similarly, 10 seconds was chosen as the time window size to group both OSPF "ADJ-CHANGE" LSAs and path changes in OSPF. 35 seconds was chosen for grouping BGP messages into events, which is consistent with the analysis results based on the topology and iBGP Minimum Route Advertisement Interval (MRAI) value.

Traffic anomalies are identified using the above signal processing techniques and the window size is the same as the SNMP data sampling interval (5 minutes). The SNMP 5-min record on each link is modeled as a time series in an auto-regression (AR) process with an order of p=1. The abrupt increase or decrease is identified using the residual variance of current record and previous history data. The overall behavior changes is detected using a window of recent 2 hour data with history data to can avoid the impact of short-term link flaps or short term user behavior change. The threshold of generalized likelihood ratio is tuned to be 0.7 by verifying the detected abrupt change with known events in other data sources.

After the event identification, all raw messages are significantly reduced to a smaller amount of events: the number of BGP events is 72% of all BGP updates; the number of Syslog events is 37% of all the Syslog messages. The number of OSPF events is 1.5% of all the OSPF LSAs and 9% of the LSAs excluding the refreshing messages; the number of SNMP events is 2% of the raw messages.

Figure 8:
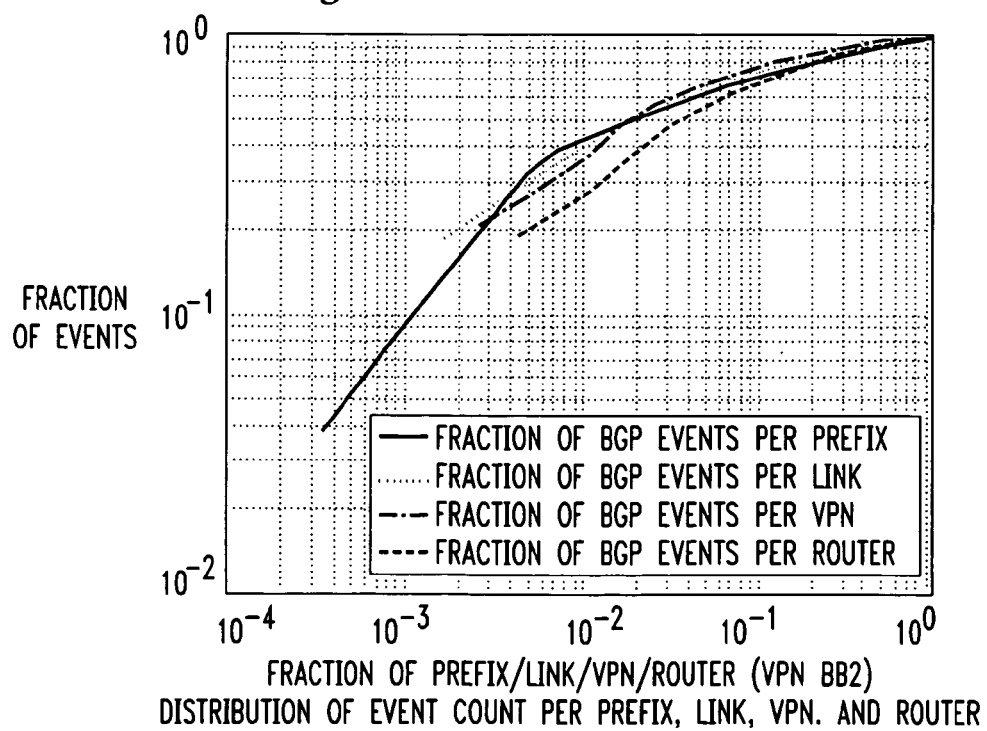
FIG. 8 is an exemplary plot of a distribution count.

A small number of prefixes contributed to a majority of BGP events in the public Internet. FIG. 8 shows the fraction of BGP events aggregated in different levels for VPN BB2. It shows significant "skewness" in that 1% of VPN prefixes contribute to 40% of BGP events, but it is less skewed than the results for public Internet. The skewness in per-link contribution is more significant than that of per-VPN and per-router.

Figure 9:
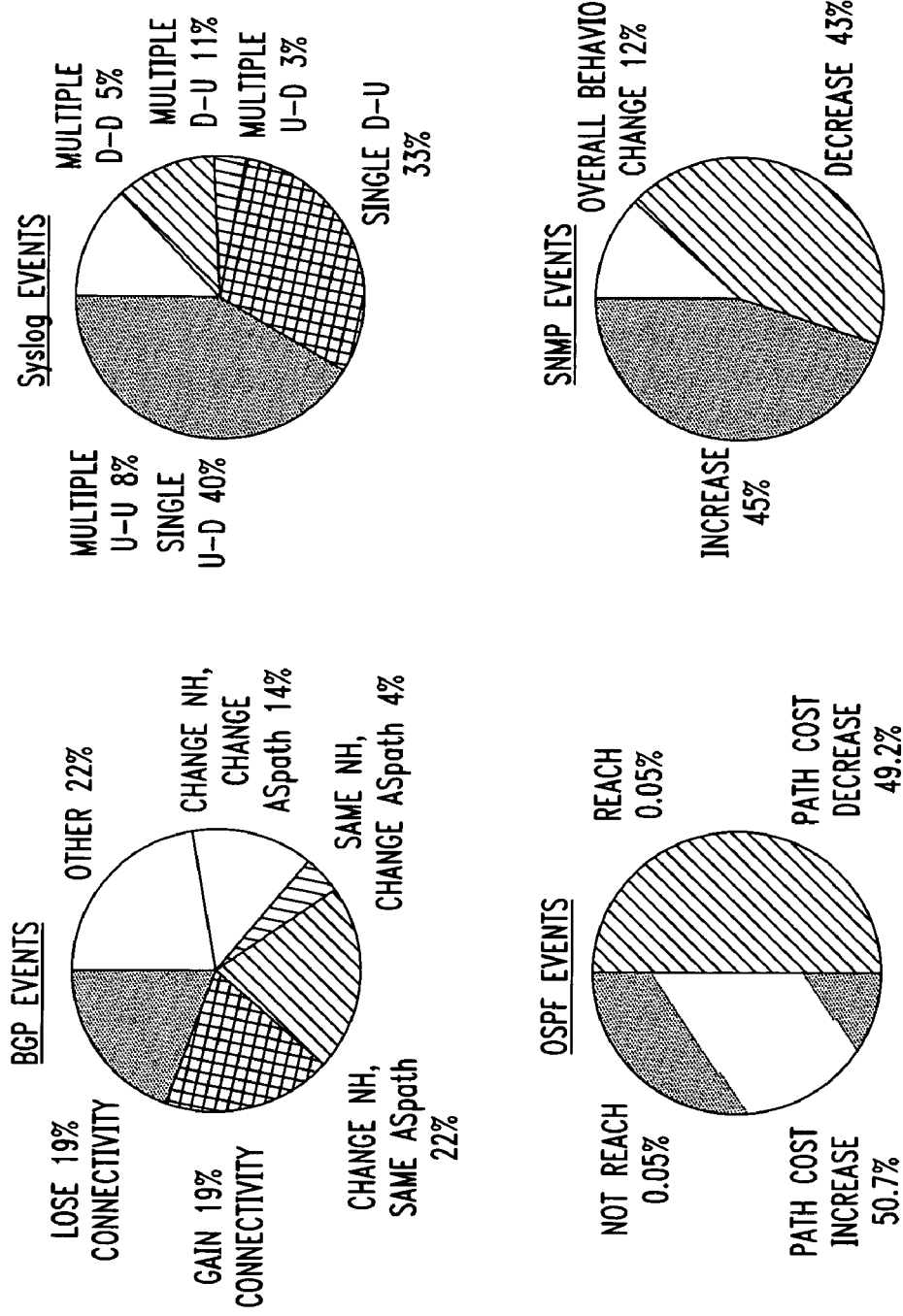
FIG. 9 is an exemplary VPN BB2 event classification result.

FIG. 9 shows the classification in four data sources (BGP, Syslog, OSPF and SNMP events) for VPN BB2. 19% of BGP events cause losing connectivity, that is, customer sites which connect to a single PE in the backbone. Syslog events are observed in three layers. One event can be classified according to how many times it changes the status within the event, as well as the states before and after the events. 73% of the Syslog events are single change (either from down to up or vice versa). Most of the OSPF events are path cost changes, with less than 0.001% of unreach/reach events.

For statistical correlation, a time series was constructed per-prefix (BGP) or per-link (other data sources), and each prefix or link has an attribute of VPN, site, or PE. The statistical correlation techniques described above were applied. The independence hypothesis was rejected if the level of $a$ was greater than or equal to 5%. A correlation is considered strong if the correlation coefficient value is larger than 0.5.

In statistics, a result is called statistically significant if it is unlikely to have occurred by chance. In the context of correlation, it means the reliability of the correlation, i.e., the correlation exceeds no matter what the sample size it is. In this case, the significance level indicates how likely it is that the correlations reported may be due to chance in the form of random sampling error. The significance value usually varies from 90%-95%, which maps to an alpha ($\alpha$) value of 5%-10%, respectively.

FIG. 11 shows a statistical correlation among the time series sharing the same VPN (site) attribute, 1.2% (18.4%) shows strong correlation, which may be due to customer activities or problems of the PEs that connects to these VPN (sites). For those with the same PE, 3.5% shows strong correlation, which may be due to the changes of one common PE which connects to multiple sites/VPNs. For those with the same link, 21.4% has strong correlation, which mainly captures the correlation of events on a PE from the same CE.

The statistical correlation can infer what the problems are to the underlying common resources. One finding is as follows. Three CEs in three different VPNs are connected to the same PE via three eBGP sessions. The statistical correlation shows that there is a strong correlation between the first two of the sessions, but weak correlation between the other two pairs. Investigation of the router configurations shows that the first two sessions share the same line card, whose failure is the root cause of the session failures.

Figure 10:
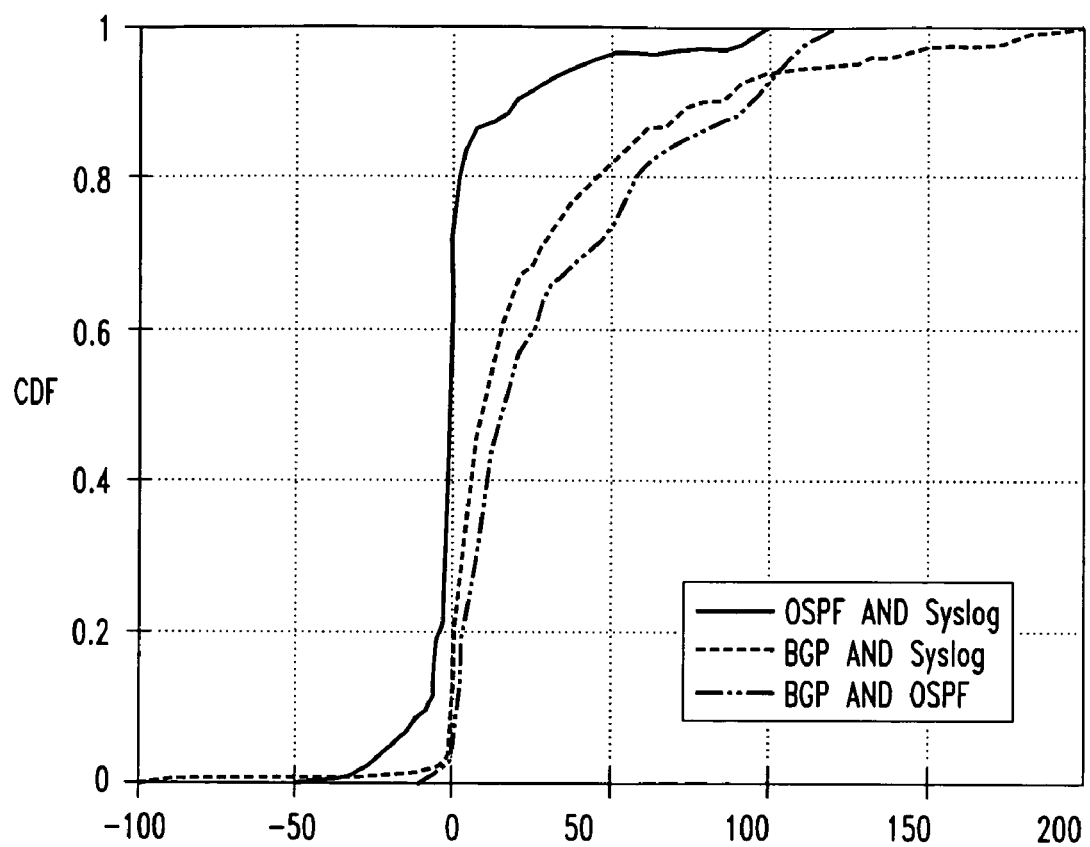
FIG. 10 is an exemplary plot of a time difference distribution of two events caused by the same root cause.

For time window-based temporal correlation, a first analysis was performed to find the initial window size. For (BGP, Syslog) correlation, a window size of T=180 seconds was used because BGP primarily uses the hold timer (default value 180 seconds) to detect session failure caused by a link failure. For (BGP, OSPF) correlation, a window size of T=60+35 seconds was used because BGP imports OSPF changes by default every 60 seconds (using the bgpscanner process) and it may take up to 35 seconds for iBGP to propagate the changes to the monitored reflectors in VPN BB1 and BB2. For (Syslog, OSPF) correlation, a window size of T=50 seconds was used because empirically it is found that the maximum intervals between Syslog events and all OSPF LSAs triggered by the same link failures is T=50 seconds. The actual interval between the correlated events is tracked using the initial window size [−T, T]. FIG. 10 shows the distribution of time differences. Based on the plot, the correlation windows are refined to the following: [−100, 180] for (BGP, Syslog), [−10, 95] for (BGP, OSPF), and [−10, 50] for (Syslog, OSPF) correlations. The correlations between SNMP and other data sources use the [−5 min, +5 min] (SNMP sampling interval).

FIG. 11 shows the results. Each cell in the $3^{rd}$ and $4^{th}$ columns (avg % src1, std1, avg % src2, std2) shows the daily average percentage of the number of correlated pairs out of total number of source 1 events, its standard deviation across days, and those for source 2. The possible false positives in the time window-based correlation ($3^{rd}$ column) are eliminated to a large extend by the spatial correlations ($4^{th}$ column).

Figures 12, 13:
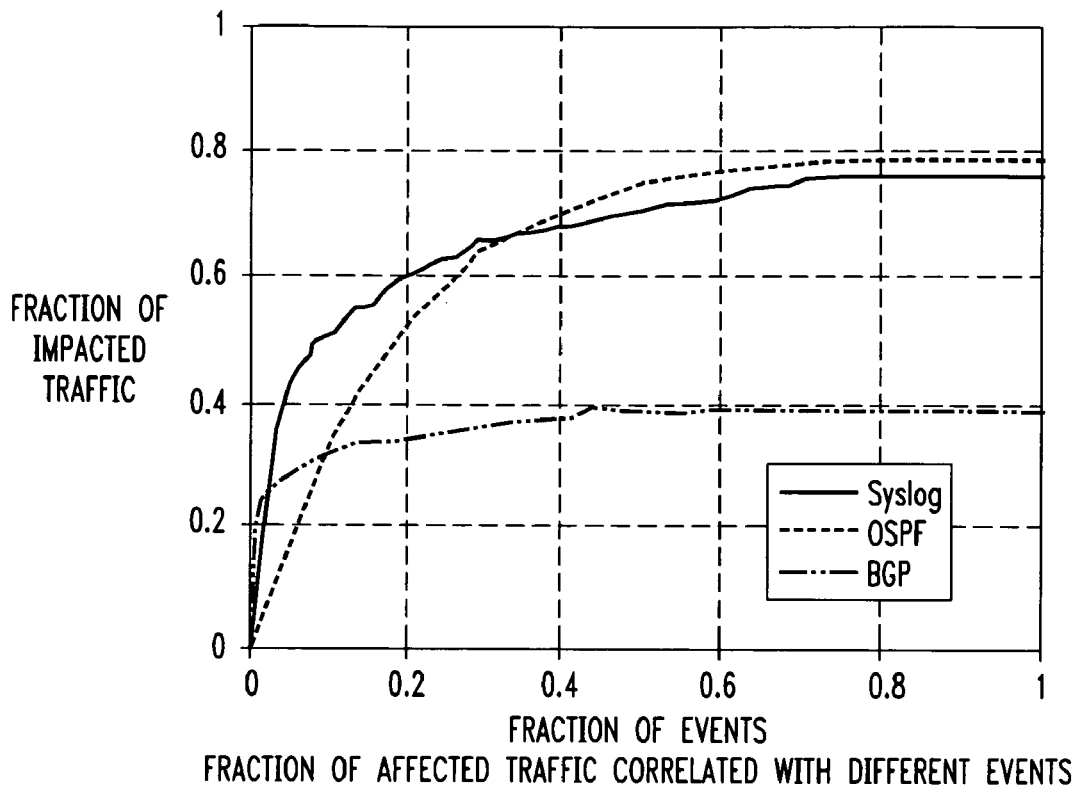
FIG. 12 is an exemplary plot of affected traffic correlated with different events.
FIG. 13 is an exemplary VPN BB2 root cause result.

For impact analysis, each event's impact was measured by correlating it with the SNMP events. FIG. 12 shows the fraction of affected traffic (as indicated by the SNMP events) that can be correlated with BGP, OSPF, and Syslog events, respectively. The same SNMP traffic event can be correlated with events in multiple data sources, such as a BGP event and a Syslog event. While most events affect little traffic as shown in each curve's flat tail, most of affected traffic can be correlated with a small number of events (20% of Syslog and BGP events). Approximately 25% of total affected traffic can be correlated with 5% OSPF events. These results help reduce the number of reports generated since those events affecting little or no traffic can be ignored.

Figure 14:
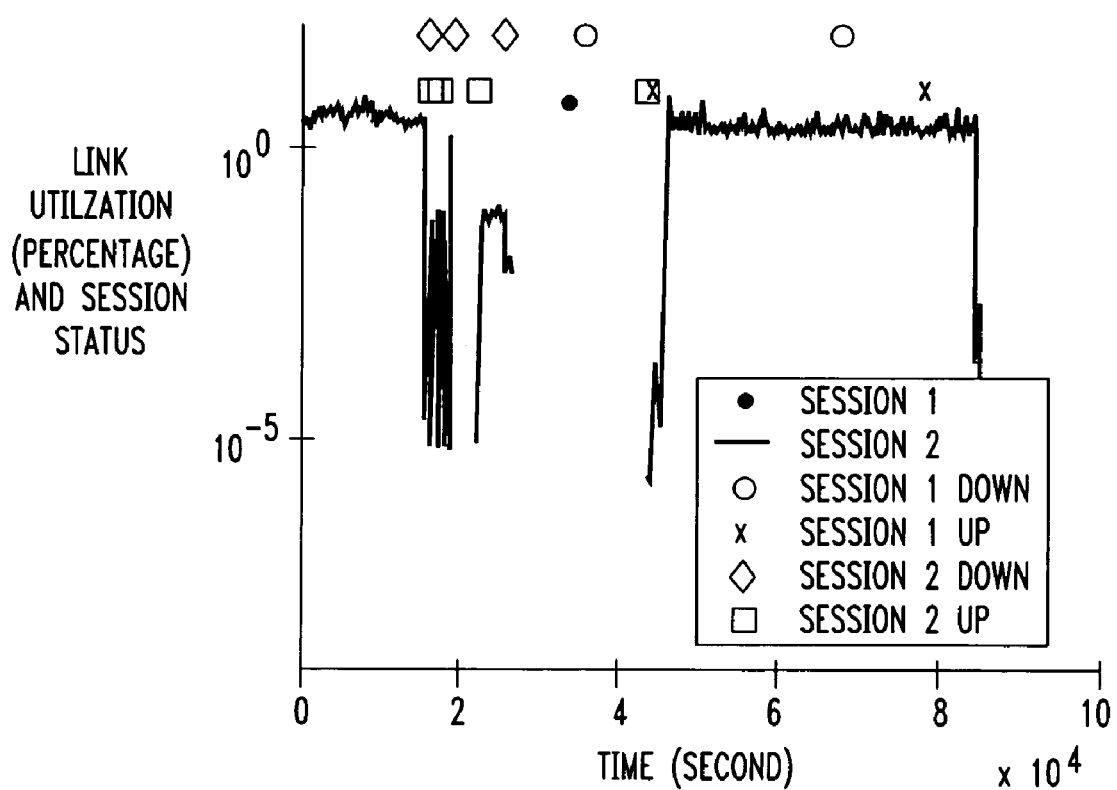

FIG. 14 shows the impact analysis revealed in one case. 24% of the session status changes found trigger one update for a PE, CE interface prefix (/32 or /30). But as FIG. 14 shows (session 1's traffic is overlapping with the x-axis, and is not clearly seen in the figure), some sessions such as session 1 do affect traffic, while others such as session 2 significantly affect traffic.

Figure 16:
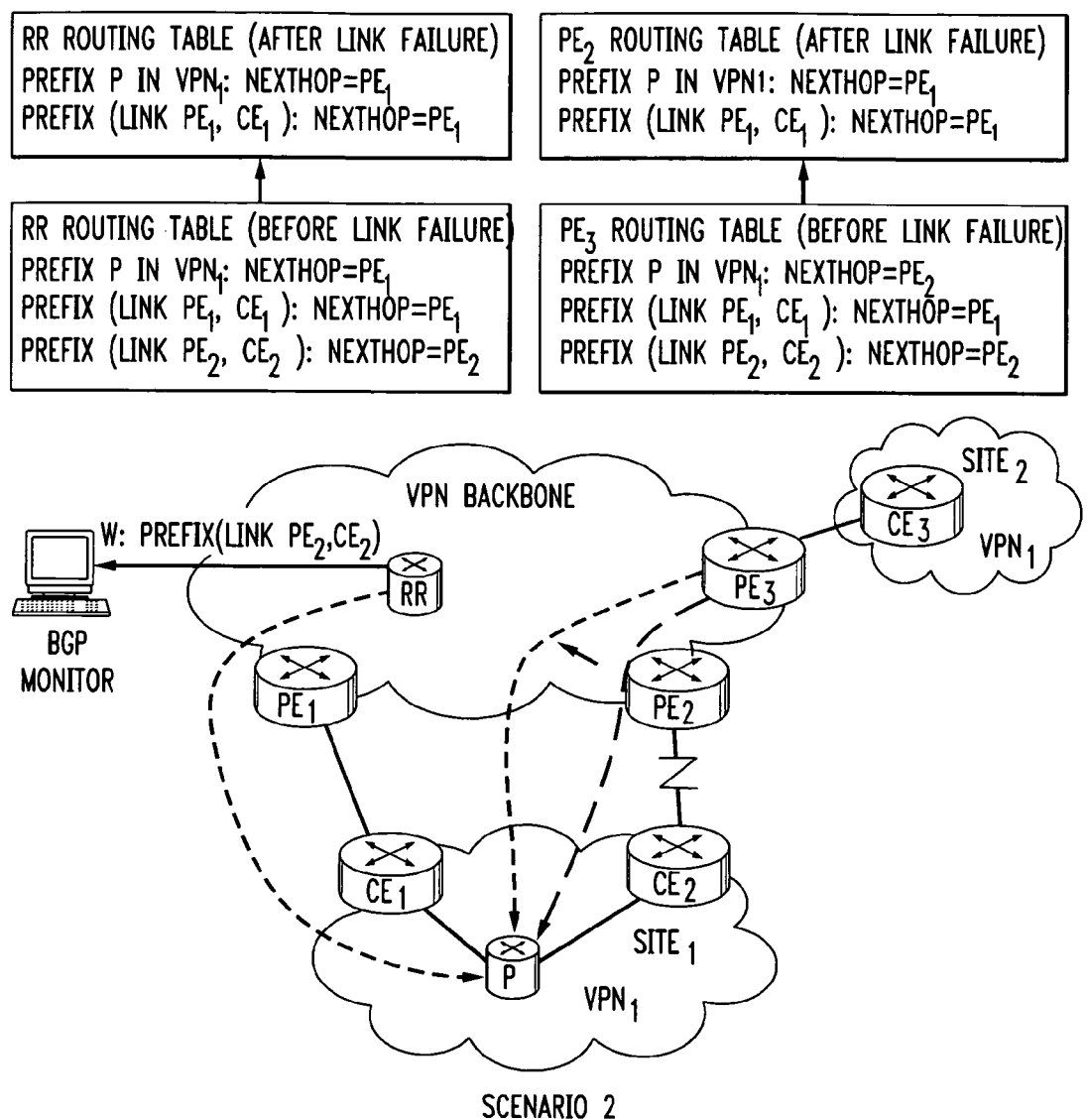

FIGS. 15 and 16 show two scenarios, 1 and 2. The monitored RR chooses to use (PE1, CE1) to reach the destination prefix p in Site 1 of VPN1, which connects to the VPN backbone via sessions (PE1, CE1) and (PE2, CE2). When the link (PE2, CE2) fails, the RR's path top remains the same, and only the interface prefix for (PE2, CE2) is withdrawn. Alternately, PE3 which forwards the VPN1 site traffic to Site 1, chooses the same path as the monitored RR in scenario 1 thus its traffic is not affected by the failure. In scenario 2, PE3 chooses to go through link (PE2, CE2), thus its traffic is affected as shown in FIG. 14. 4.3% of the session failures were found to be similar to scenario 2. This case shows that impact analysis helps detect events that affect traffic that would be otherwise neglected due to limited visibility of the BGP monitor.

For root cause, impact and mitigation analysis, FIG. 13 shows the root cause results. In terms of location of the root cause in VPN BB2, approximately 20.8%, 1%, 78% of the events are at the edge, core, and customer networks, respectively. The top three reasons or classifications are session Up/Down at the edge (20.8%), single prefix change in the customer networks (71%), and user behavior (10%).

A mitigation solution is designed based on the root cause and impact. Based on the above example and analysis, the framework 201 mitigation solution may be to fix the physical device related problem (58% of total number of mitigation solutions), report frequent flapping prefix(s) (2.5%), raise alarms (1.2%), multi-homing for connectivity assurance (35%), and traffic engineering (3.3%).

Troubleshooting using imperfect data (temporally or spatially missing parts of monitoring data) is a common problem in managing large networks. For instance, the network monitors that have been deployed may have limited visibility of network events. The network monitors may suffer a failure. Also, the monitoring data may be lost due to unreliable delivery. More importantly, missing monitoring data is also an indication of occurrence of certain type of network events. Therefore, the framework 201 is able to function with partial data available.

For the VPN backbones used in the example, both Syslog and SNMP used UDP as the transport protocol while OSPF used IP directly. The monitoring data can be lost in delivery. Missing data may be identified by tracking the sequence number in packets corresponding to event messages. The peak loss rate of monitoring data is computed in a fixed time interval. Observed data loss was in 0.03%, 0.0008%, and 0.0001% intervals for SNMP, Syslog, and OSPF, respectively. SNMP also suffers relatively higher peak loss rate compared to Syslog and OSPF. For example, SNMP experiences peak loss rates of 90% in 0.03% intervals, while the corresponding figures for Syslog peak loss rates were 15%~30% in 0.0006% intervals. OSPF suffers even less loss. Only 0.00008% intervals experiences 5%. Furthermore, BGP monitoring data can also be lost due to network outages which cause the monitoring session to be reset. However, this occurs less frequently compared to other three data sources because BGP uses TCP as the transport protocol.

To evaluate robustness and effectiveness of the framework 201 when part of the monitoring data is missing, a scenario was emulated by randomly sampling lossy periods. For each sample, the starting time was randomly selected and the emulated loss was for a fix time period, i.e., all the data acquired within the sampled time period is lost. The length of the lossy period is determined by the loss duration observed in the empirical data. In particular, the lossy period length was selected to cover 90% of the loss duration observed in empirical data: 200 seconds for BGP, 10 seconds for OSPF, 30 seconds for Syslog, and 5 minutes for SNMP.

Figure 17:
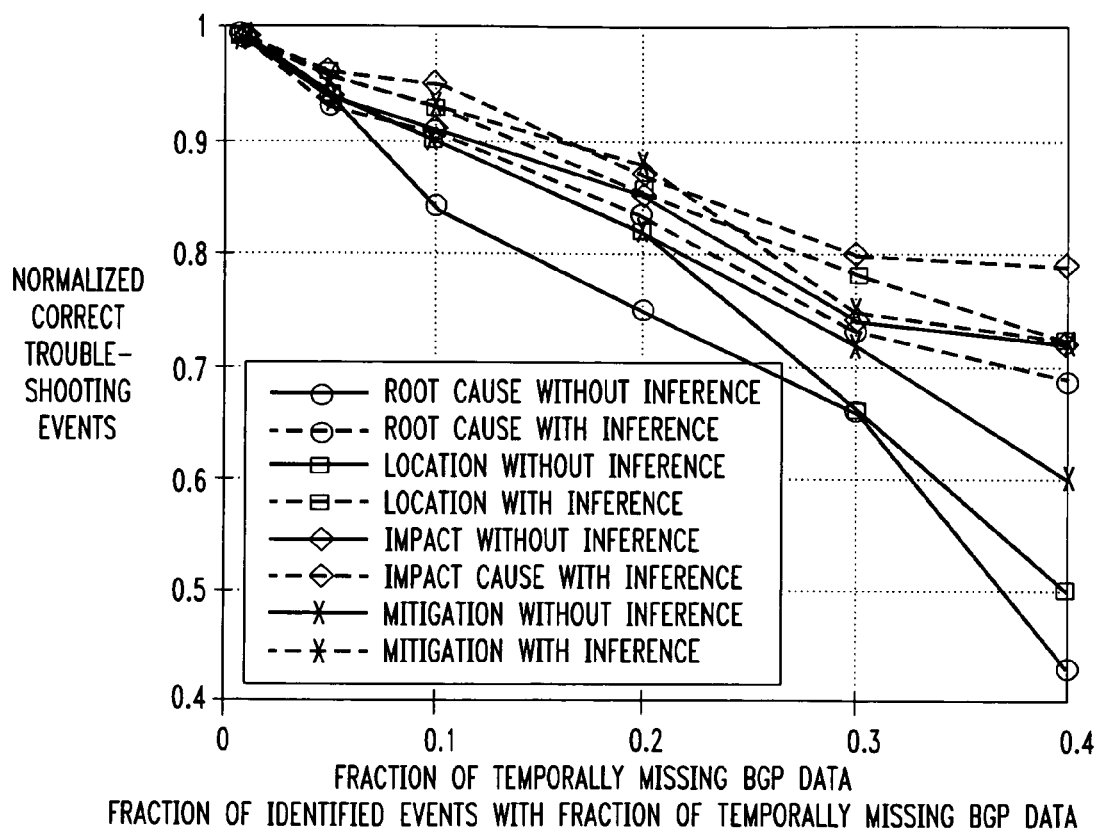
FIG. 17 is an exemplary plot of identical events with a fraction of temporally missing BGP data.

FIG. 17 shows the impact of temporarily missing BGP data on troubleshooting network events in terms of location, root cause, impact, and mitigation. The percentage of network events that the framework 201 can correctly troubleshoot decreases as the percentage of missing data increases. However, the framework is able to troubleshoot approximately 90% of events even with 10% of data missing. Therefore, the framework 201 is robust and effective enough to handle the missing BGP data experienced in practice. The inference rules assist in troubleshooting network events with partial BGP data missing. The results for missing partial OSPF, Syslog, and SNMP data are similar. Inference rules are helpful when partial Syslog data is missing, troubleshooting events at the edge and inside the core of a VPN backbone. The inference rules assist troubleshooting when partial OSPF data is missing, and improve the accuracy of identifying traffic abrupt changes when partial SNMP data are missing.

The framework 201 was evaluated regarding spatially missing data. Three realistic scenarios were constructed: missing BGP data from an RR, missing OSPF data from non-area 0, and missing Syslog data from routers at a given location (e.g., a city). FIG. 17 shows the results in terms of correctly identifying location, root cause, impact, and mitigation of network events. Without using inference rules, the framework 201 can correctly troubleshoot 71%~97% of network events. The use of inference rules improves the corresponding figures to 84%~98%. The framework 201 is robust and effective enough to handle spatially missing data experienced in actual operation.

For a given VPN backbone, the complexity of network troubleshooting depends on the size of the VPN backbone network, the distribution of VPN customers, and how the network behaves. FIG. 19 shows a list of the parameters that are used in the complexity model.

1) Computational Complexity: For a given event, the maximum number of events within the correlation window T is $$m = T_{max} \times (\alpha_b \times p + \alpha_s \times (l_s + e_s) + \alpha_0 \times l + \alpha_t \times (l+e)), \text{ or}$$

$$m = T_{max} \times (\alpha_b \times p + (\alpha_b \times p + (\alpha_s \times \lambda_{ses} \alpha_0 + \alpha_t) \times l + (\alpha_s \times \lambda_{ses} + \alpha_t) \times e). \quad (3)$$

The complexity for performing correlation for a given event (including updating the lattice data structure) is O(m). Therefore, the computational complexity for performing event classification is $$O\left(\frac{m^2}{T_{max}}\right).$$

To speed up the process, multiple processors can be used and the computation time decreases proportionally with the number of processors.

2) Memory Consumption: For time window based correlation, the lattice data structure needs to keep state for each data unit (i.e., a prefix for the BGP data, a session for the Syslog data, and a link for OSPF and traffic data). Then, the total number of states is $$O(p + l_s + e_s + l + l + e) = O(p + (2 + \lambda_{ses}) \times l + (1 + \lambda_{ses}) \times e) \quad (4)$$

The memory consumption for time window based correlation is relative static for a given VPN backbone.

For statistical correlation, the lattice data structure requires the state for each pair of data units with correlated events. Thus, the actual number of correlation coefficients needed to keep is $$O((p + l_s + e_s + l + e + l)^2) = O((p + (2 + \lambda_{ses}) \times l + (1 + \lambda_{ses}) \times e)^2) \quad (5)$$

The memory consumption for statistical correlation can increase dynamically. In the worst case, $\gamma=1$. However, because only the pairs of data units with correlated events are kept, the average value of $\gamma$ would be much smaller than 1.

When the size of the VPN backbone increases or the number of correlated network events increases, the memory consumption will increase dramatically. To reduce memory usage, an online compression mechanism is implemented in the lattice data structure which allows correlation to be performed at an aggregated level. There is a trade-off between accuracy and memory consumption. The amount of memory consumes given an accuracy $\epsilon$ can be bounded by $$O\left(\left(\frac{H}{\epsilon}\right)\log(\epsilon N)\right), \quad (6)$$

where H=16 is the lattice height and, $$N = O(p \times \lambda_{sys} \times l \times (l+e)^2) \quad (7)$$

is the lattice size.

3) Bandwidth Consumption: The bandwidth of transmitting all the event messages of various data sources to a centralized server would consume $$O(\beta_b \times \alpha_b \times p + \beta_s \times \alpha_s \times (l_s + e_s) + \beta_0 \times \alpha_0 \times l + \beta_t \times \alpha_t \times (l+e)), \text{ or} \quad (8)$$

$$O(\beta_b \times \alpha_b \times p + (\beta_s \times \alpha_s \times \lambda_{ses} + \beta_0 \times \alpha_0 + \beta_t \times \alpha_t) \times l +$$

$$(\beta_s \times \alpha_s \times \lambda_{ses} + \beta_t \times \alpha_t) \times e) \frac{\text{bytes}}{\text{seconds}}.$$

1) Scalability Analysis using empirical data: For the VPN backbones used in the examples, the average number of external and internal links per router $\lambda_{le}$ and $\lambda_{li}$ were 153 and 24, with the maximum of 906 and 899, respectively. The average number of sessions per link is 0.4 and can be up to 0.9. Both the number of sites per VPN customers and number of VPN prefixes per sites vary. They can be up to 2761 and 6231 with average of 22 and 25, respectively. When the estimated value of $\alpha_b$, $\alpha_s$, $\alpha_0$, and $\alpha_t$ are 0.000089, 0.00006, 0.00005, 0.00009, the computation and memory complexities are $O(0.01p+0.03l+0.02e)$ and $O(p+2.4l+1.4e)^2$, respectively. If the estimated value of $\beta_b$, $\beta_s$, $\beta_0$, and $\beta_t$ are 3, 0.6, 70, 0.003, the bandwidth consumption for shipping data to centralized location is $$O(0.00027p + 0.00351 + 0.00002e) \frac{\text{bytes}}{\text{seconds}}.$$

Figure 20:
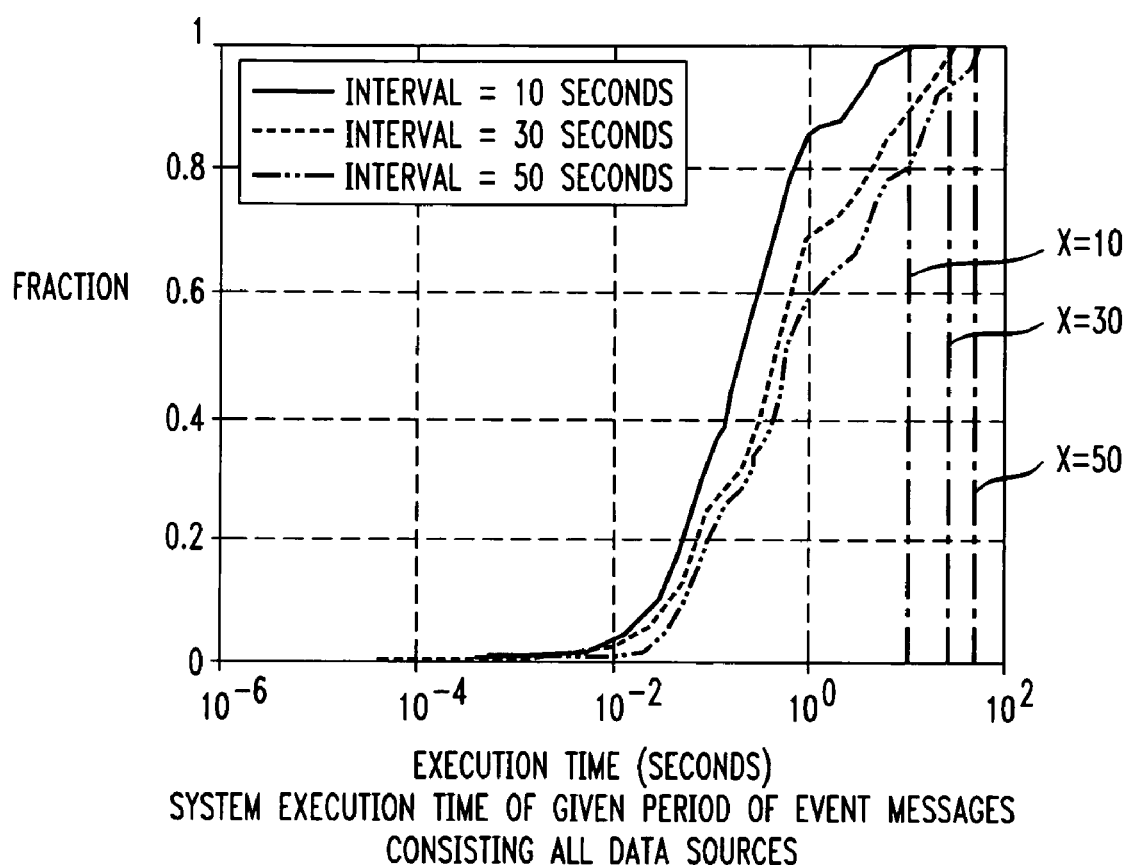
FIG. 20 is an exemplary plot of system execution time.

2) CPU and Memory Consumption: The system execution time was measured for event messages including BGP updates, OSPF LSAs, Syslog and SNMP records, where SNMP data has one record every 5 minutes and other event messages can have various inter-arrival time. FIG. 20 shows the distribution of the execution time for a sequence of event messages from all four data sources arriving within a given time period. Using a single 900 MHz CPU, for any 10 second period, there were only 1.2% of event messages slightly lagging behind. All event messages can be processed in real time for any given 50 seconds period. Furthermore, the static and dynamic memory consumptions are 350 MB and 380 MB, respectively. The above results demonstrated that, even using low-end PC, the framework can be used to troubleshoot commercial VPN backbones in real-time.

3) Distributed Troubleshooting: Analysis shows that as the number of VPN customers increases, it is not feasible to perform troubleshooting at a centralized server because the computational complexity, memory and bandwidth consumption will increase dramatically. Therefore, a distributed troubleshooting tool is very desirable. For performing troubleshooting in a distributed way, the VPN backbone can be divided into a number of local domains (i.e., a set of routers and prefixes). This can be done either based on geographical locations or based on VPN customers. Then, workload can be divided based on the nature of the data sources. The event classification can be performed within each domain and prioritized in the following order: within a single domain, across two domains, in a centralized view.

One or more embodiments of the present invention have been described. Nevertheless, it will be understood that various modifications may be made without departing from the spirit and scope of the invention. Accordingly, other embodiments are within the scope of the following claims.

What is claimed is:

1. A tangible article of manufacture excluding propagating signals and storing machine readable instructions for implementing a framework for troubleshooting a virtual private network (VPN) backbone in real-time, the machine readable instructions, when executed, causing a machine to implement:
 a plurality of event identification modules to receive messages from a corresponding number of monitors in the VPN backbone and identify the received messages as events if a change occurs with a predetermined time window, or if the message is a deviation from a predefined metric, each event identification module having an output;
 a plurality of event classification modules each having an input coupled to a corresponding event identification module output, each event classification module to classify each identified event depending on the type of change indicated by the event, each event classification module having an output;
 a temporal correlation module having a plurality of inputs, each input coupled to each event classification module output, the temporal correlation module to perform time-window based and statistical based correlation for the identified and classified events, the temporal correlation module having an output;
 a spatial correlation module having an input coupled to the temporal correlation module output, the temporal correlation module to filter the correlated events, the spatial correlation module having an output;
 an impact analysis module having an input coupled to the spatial correlation module output, the impact analysis module to estimate a VPN impact based on an event type and degree, the impact analysis module having an output; and
 a root cause and mitigation module having an input coupled to the impact analysis module output, the root cause and mitigation module to identify each event's root cause location and failure, determine a mitigation strategy for that event, and output the mitigation strategy.

2. The tangible article of manufacture according to claim 1 wherein the temporal correlation module to form a lattice of a partially ordered set of events in which every pair of events has a unique join and meet to form axiomatic correlation identities.

* * * * *